US010380721B2

(12) United States Patent
Agrawal et al.

(10) Patent No.: US 10,380,721 B2
(45) Date of Patent: Aug. 13, 2019

(54) ADJUSTING BLURRY VECTOR-BASED LINES DURING MOVEMENT

(71) Applicant: Adobe Inc., San Jose, CA (US)

(72) Inventors: Vivek Agrawal, Noida (IN); Prashant Kumar Singh, Ghaziabad (IN); Ankit Aggarwal, Faridabad (IN)

(73) Assignee: ADOBE INC., San Jose, CA (US)

(*) Notice: Subject to any disclaimer, the term of this patent is extended or adjusted under 35 U.S.C. 154(b) by 20 days.

(21) Appl. No.: 15/499,602

(22) Filed: Apr. 27, 2017

(65) Prior Publication Data

US 2018/0315169 A1    Nov. 1, 2018

(51) Int. Cl.
*G06T 5/00*    (2006.01)
*G06T 11/60*   (2006.01)

(52) U.S. Cl.
CPC ............ *G06T 5/003* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 5,731,819 A * | 3/1998 | Gagne | ..................... | G06T 17/20 345/647 |
| 6,101,514 A * | 8/2000 | Chan | ..................... | G06K 15/02 715/232 |
| 2003/0007135 A1* | 1/2003 | Sciammarella | ........ | G03B 21/28 353/98 |
| 2008/0012859 A1* | 1/2008 | Saillet | ..................... | G06T 11/60 345/440 |
| 2012/0262465 A1* | 10/2012 | Keane | ..................... | G06T 11/40 345/505 |
| 2012/0299961 A1* | 11/2012 | Ramkumar | ....... | G06F 17/30047 345/632 |
| 2013/0132907 A1* | 5/2013 | Kukulski | ................ | G06F 3/048 715/838 |
| 2013/0335452 A1* | 12/2013 | Suchomel | ............ | G06T 11/203 345/660 |
| 2015/0145873 A1* | 5/2015 | Akenine-Moller | ..... | G06T 11/40 345/506 |
| 2016/0274767 A1* | 9/2016 | Gupta | .................. | G06F 3/04845 |
| 2018/0217383 A1* | 8/2018 | Guenter | ............ | G02B 27/0179 |

* cited by examiner

*Primary Examiner* — David H Chu
(74) *Attorney, Agent, or Firm* — Keller Jolley Preece

(57) ABSTRACT

This disclosure covers systems and methods that sharpen the appearance of a digital illustration while moving the digital illustration. In certain embodiments, upon receiving a command to move a digital illustration, the disclosed systems and methods move the digital illustration (and its constituent line segments) to positions that both sharpen the appearance of the digital illustration and respond to the command. To facilitate sharpening the appearance of a digital illustration as part of a seemingly continuous movement, in some embodiments, the disclosed systems and methods move a blurry digital illustration to a position that sharpens the appearance of blurry axial-line segments by translating the digital illustration according to a translation vector and a command to move the digital illustration.

20 Claims, 13 Drawing Sheets

ADJUSTING BLURRY VECTOR-BASED LINES DURING MOVEMENT

BACKGROUND

Graphic designers and other artists increasingly use digital graphic editing software to create and modify digital illustrations. For example, popular digital graphic editing software, such as Adobe Illustrator, enable artists to create and integrate their digital illustrations with other designs. When using digital graphic editing software, artists commonly create digital illustrations in vector-file formats to facilitate editing such digital illustrations. Some such vector-file formats include AI, SVG, or EPS file formats. After editing a digital illustration, artists often use digital graphic editing software to rasterize digital illustrations into a raster file format, such as JPG, PNG, or BMP file formats.

Regardless of the rasterized format, artists seek to adjust the settings and otherwise modify digital illustrations to produce a crisp illustration. A crisp digital illustration aligns the line segments of the digital illustration with a pixel grid. But a digital illustration may blur when the illustration's line segments misalign with the pixel grid. In other words, the pixels within a digital illustration's line segments may seep outside of a crisp boundary and cause the edges of a digital illustration to appear blurry.

Conventional digital graphic editing software include editing tools intended to sharpen the appearance of blurry digital illustrations. Unfortunately, conventional editing tools have proven inaccurate, inflexible, and/or tedious. In conventional digital graphic editing software, for example, cursors may manipulate one edge or one pixel of a digital illustration under the manual control of a user. But such edge-by-edge or pixel-by-pixel manipulation can prove tedious, produce an asymmetric illustration, and inhibit artists from fixing a blurry illustration.

In addition to such editing tools, some digital graphic editing software uses a naïve-pixel-grid method to align a digital illustration to conform to a pixel grid. By automatically conforming a digital illustration to a pixel grid, the naïve-pixel-grid method sometimes (and unintentionally) blurs a previously crisp-looking digital illustration. Although the naïve-pixel-grid method aligns a digital illustration's blurry edges with a pixel grid, it leaves the digital illustration's edges blurry and cannot adjust the clarity of an individual edge.

In addition to the naïve-pixel-grid method, some digital graphic editing software uses an align-to-pixel-grid method to modify blurry digital illustrations. But the align-to-pixel-grid method attempts to adjust a digital illustration in response to every user operation and, consequently, gradually distorts geometric shapes by altering the dimensions of a digital illustration. In addition to the gradual distortion, the align-to-pixel-grid method adjusts the dimensions of a digital illustration in a randomly chosen direction without user control or input. Because of the align-to-pixel-grid method's distorting effects, some digital illustrators have disabled the align-to-pixel-grid method by default when artists edit rectangular, elliptical, rounded rectangular, or polygonal shapes.

In sum, existing digital illustrators apply editing tools that have proven inaccurate, inflexible, and tedious, among other disadvantages, and thus inhibit sharpening the appearance of blurry digital illustrations in an efficient and aesthetically pleasing manner.

SUMMARY

This disclosure describes one or more embodiments of systems and methods that solve some or all the foregoing problems in addition to other benefits. To solve these and other problems, the disclosed systems and methods sharpen the appearance of a digital illustration while moving the digital illustration. In particular, upon receiving a command to move a digital illustration, the disclosed systems and methods move the digital illustration (and its constituent line segments) to positions that both sharpen the appearance of the digital illustration and respond to the command to move the digital illustration.

In some such embodiments, for instance, the disclosed systems and methods receive a command to move a digital illustration. After receiving the command to move the digital illustration, the disclosed systems and methods determine whether translating the digital illustration's blurry line segments would sharpen their appearance. The disclosed systems and methods then determine an amount of movement that would sharpen the appearance of the blurry line segments. Having determined that amount, the disclosed systems and methods move the digital illustration to a position that sharpens the appearance of the blurry line segments by translating the digital illustration according to the determined amount of movement and the command to move the digital illustration.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

DETAILED DESCRIPTION

Figure 1A:
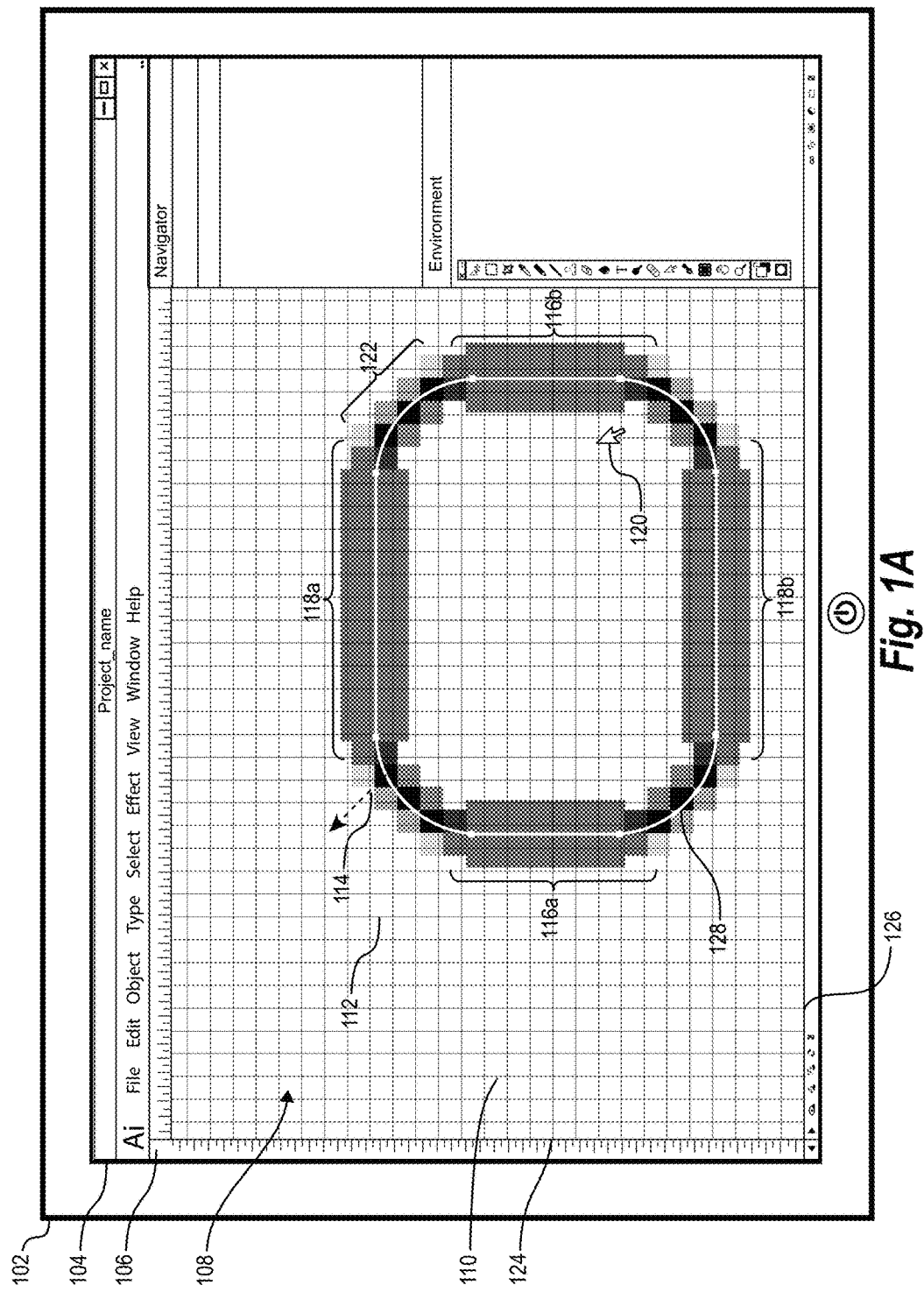
FIGS. 1A-1B illustrate views of a graphical user interface in which a digital illustration system sharpens an appearance of axial-line segments of a digital illustration while moving the digital illustration in accordance with one or more embodiments.

This disclosure describes one or more embodiments of a digital illustration system that sharpens the appearance of a digital illustration while moving the digital illustration. In particular, upon receiving a command to move a digital illustration, the digital illustration system moves the digital illustration (and its constituent line segments) to a position that both sharpens the appearance of the digital illustration and responds to the command to move the digital illustration.

In one or more embodiments, the disclosed digital illustration system automatically fixes blurriness of a digital illustration while moving, or changing a position of, the digital illustration. In other words, the digital illustration system automatically fixes blurriness of a digital illustration in response to a user command to move the digital illustration without further user input or commands. Thus, in one or more embodiments, the digital illustration system enables users to freely edit a digital illustration without needing to manually adjust the digital illustration to correct blurriness due to misalignment of pixels.

More specifically, in some embodiments, the digital illustration system receives a command to move a digital illustration. After receiving the command to move the digital illustration, the digital illustration system determines whether translating blurry line segments relative to a pixel grid would sharpen the appearance of the blurry line segments. Upon determining that translating the blurry line segment would sharpen their appearance, the digital illustration system generates a translation vector to translate the digital illustration relative to the pixel grid to sharpen the blurry line segments. The digital illustration system then moves the digital illustration to a position that sharpens the appearance of the line segments by translating the digital illustration according to the translation vector and the command to move the digital illustration. By moving the entire digital illustration rather than only the line segments that can be sharpened, the digital illustration system ensures, in one or more embodiments, that the appearance of the digital illustration sharpens while moving without distorting the dimensions or shape of the digital illustration.

When determining whether translation can sharpen the appearance of certain line segments, the digital illustration system determines whether translating line segments would align the edges of the line segments with a pixel grid or a sub-pixel grid. In some embodiments, the digital illustration system determines that the appearance of line segments that are collinear or parallel to each other can be sharpened only when such collinear or parallel line segments can be translated in a same direction and by a same amount.

After determining that translation would sharpen the appearance of certain line segments, the digital illustration system generates a translation vector. In particular, the digital illustration system determines an amount of movement relative to a pixel grid that would sharpen one or more line segments of the digital illustration. Typically, this amount of movement is a fraction of a pixel (i.e., a movement less than an entire pixel). The translation vector specifies a direction and the fraction of a pixel needed to sharpen the line segment(s). Depending on the direction of the command to move, the digital illustration system optionally adds either the translation vector or inverts a direction of the translation vector and adds it to the digital illustration's original position. By adding the translation vector to the digital illustration's original position—as part of moving the digital illustration—the digital illustration system sharpens the appearance of line segments while moving the digital illustration.

As mentioned above, the digital illustration system determines whether the appearance of line segments that are collinear or parallel to each other can all be sharpened by translation in the same direction and by the same pixel fraction. In one or more embodiments, if the blurry collinear or parallel line segments can all be fixed by moving them in the same direction and by the same pixel fraction, the digital illustration system moves the digital illustration by the pixel fraction to sharpen all of the blurry collinear or parallel line segments. On the other hand, if all the blurry collinear or parallel line segments cannot all be fixed by moving them in the same direction and by the same pixel fraction, the digital illustration system does not sharpen any of the blurry collinear or parallel line segments to ensure that the shape and/or dimensions of the digital illustration are not distorted. Thus, in certain embodiments, the digital illustration system may sharpen the appearance of some (but not all) line segments that form a digital illustration.

For example, the digital illustration system may sharpen the appearance of all the vertical blurry line segments, but not the appearance of the horizontal blurry line segments. In some cases, the digital illustration system sharpens the appearance of all line segments (i.e., both the vertical and the horizontal blurry line segments) when doing so does not distort the digital illustration. As suggested above, when adjusting multiple line segments, sharpening the appearance of line segments depends on whether collinear or parallel line segments can be translated in a same direction by a same fraction of a pixel to align them with a pixel grid or sub-pixel grid. When the digital illustration system determines that translation by a same fraction of a pixel would sharpen collinear or parallel line segments, the digital illustration system translates the digital illustration by the same fraction of a pixel in a given direction to sharpen the blurry line segments.

As another example, the digital illustration system may translate a digital illustration in a vertical direction by a given fraction of a pixel to sharpen multiple horizontal-line segments. Additionally, or alternatively, the digital illustration system may translate the digital illustration in a horizontal direction by a given fraction of a pixel to sharpen multiple vertical-line segments. After initially moving the digital illustration by a fraction of a pixel in one or more directions to sharpen the appearance of blurry lines, the digital illustration system limits further movement to integers of pixels to maintain the crispness of the sharpened lines. In some embodiments, and in contrast to the naïve-pixel-grid method, the digital illustration system sharpens the appearance of a single line segment by translating a horizontal or vertical-line segment a fraction of a pixel in response to a command to move the horizontal or vertical-line segment.

When translating a digital illustration or its line segments, in some embodiments, the digital illustration system modifies the digital illustration as a vector-based image. Additionally, after modifying a digital illustration, the digital illustration system optionally generates a rasterized image of the digital illustration with the digital illustration positioned in sharpened form. This rasterized image represents a crisper version of the blurry digital illustration that the digital illustration system translated. Regardless of whether it generates a rasterized image, however, the digital illustration system preserves a raster view of a vector-based image by maintaining the image's stroke settings and dimensions. Accordingly, the disclosed digital illustration system differs significantly from the naïve-pixel-grid method, which fails to detect a digital illustration's stroke settings or adjust complex geometric shapes, such as polygons or stars.

By combining translation vectors with a digital illustration's movement, the digital illustration system improves the computerized process of adjusting the pixels of a digital illustration's line segments. That translation produces a more accurate and efficient sharpening process than conventional editing tools. In contrast to conventional editing tools that distort a digital illustration's shape, such as the align-to-pixel-grid method, the digital illustration system sharpens the appearance of line-segment edges while retaining the digital illustration's geometric shape.

Indeed, as part of a seemingly continuous movement, the digital illustration system seamlessly alters blurry digital illustrations to produce a crisp representation of line segments while the digital illustration moves. Unlike the align-to-pixel-grid method, however, the digital illustration system does not attempt to sharpen a digital illustration in response to each user operation, but instead translates line segments consistent with the direction of a user's command to move the digital illustration.

In addition to sharpening the appearance of digital illustrations as part of a continuous movement, the digital illustration system also sharpens the appearance of line segments within digital illustrations of any geometric shape or any stroke setting. By adjusting such line segments, the digital illustration system provides a more flexible editing tool than those found in conventional digital illustration systems, such as the naïve-pixel-grid method. Moreover, unlike the align-to-pixel-grid method, the digital illustration system adjusts the stroke settings of a digital illustration without distorting its dimensions. Beyond more flexibility, the digital illustration system also automates a sharpening process with an accuracy unmatched by manual edge-by-edge or pixel-by-pixel adjustment.

Figure 1B:
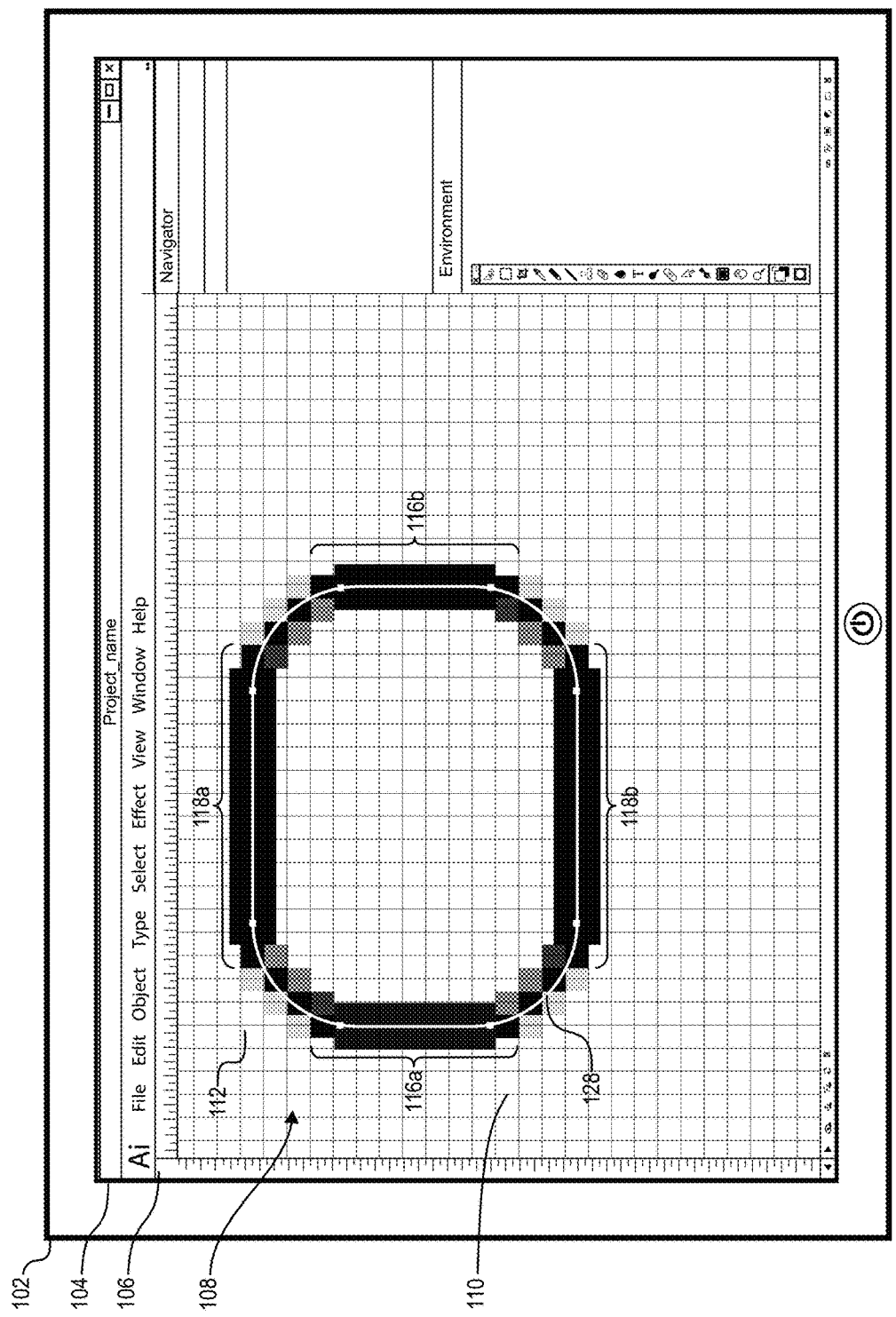

Turning now to the figures, FIGS. 1A-1B illustrate views of a graphical user interface in which a digital illustration system generates and sharpens an appearance of a digital illustration while moving the digital illustration. In both FIGS. 1A and 1B, a client device 102 presents a digital illustration 112 within a graphical user interface 106 on a screen 104 of the client device 102. To create the graphical user interface 106, the digital illustration system causes the client device 102 to generate the digital illustration 112 within a canvas 108. Additionally, the digital illustration system optionally causes the client device 102 to overlay a pixel grid 110 comprising horizontal and vertical reference lines on the canvas 108. In some embodiments, a user can select a setting to cause the pixel grid 110 to appear.

For ease of reference, this disclosure primarily describes the digital illustration system as generating, modifying, moving, and otherwise manipulating a digital illustration rather than a client device manipulating a digital illustration. The digital illustration system, however, comprises computer-executable instructions that cause a client device to generate, modify, move, translate, and otherwise manipulate a digital illustration. Rather than repeatedly describe the relationship between the instructions within the digital illustration system and the client device, this disclosure will primarily describe the digital illustration system as performing certain acts as a shorthand for that relationship.

Turning back now to the figures, FIGS. 1A and 1B represent a before-and-after comparison. FIG. 1A illustrates the digital illustration 112 as a rounded-rectangular shape before movement. FIG. 1B illustrates the digital illustration 112 as a rounded-rectangular shape, but with sharper appearing axial-line segments after movement.

As used in this disclosure, the term "digital illustration" refers to any digital artwork, drawing, icon, image, text, or combination thereof. A digital illustration may take the form of any geometric or non-geometric shape. Additionally, the digital illustration system may generate the digital illustration as a vector-based image or a rasterized image. The digital illustration 112 shown in FIG. 1A, however, is a vector-based image that the digital illustration system generates with pixels as a preview of how the digital illustration would appear as a rasterized image. Accordingly, the digital illustration system generates and modifies the digital illustration 112 within the canvas 108 in a raster preview.

As suggested above and shown in FIG. 1A, some digital illustrations include axial-line segments. The term "axial-line segment" refers to a horizontal or vertical line of any width that is part of a digital illustration. This disclosure describes certain line segments as axial because such line segments appear parallel to (or flush with) horizontal or vertical reference lines. Such horizontal or vertical reference lines may be visible or invisible within a graphical user interface. The reference lines may be, for example, part of a pixel grid.

When shown in rasterized format or in a raster preview like FIG. 1A, horizontal-line segments and vertical-line segments typically comprises two or more shaded pixels. But an axial-line segment may also refer to a vector within a vector-based image that appears horizontal or vertical when the digital illustration system renders the axial-line segments within a graphical user interface. For ease of reference, this disclosure primarily describes axial-line segments as they appear within a graphical user interface in a raster preview.

FIG. 1A includes examples of axial-line segments. As shown in FIG. 1A, the digital illustration 112 includes a first vertical-line segment 116a and a second vertical-line segment 116b (collectively referred to as "vertical-line segments 116a, 116b"). The edges of the vertical-line segments 116a, 116b are aligned with the vertical reference lines of the pixel grid 110. The digital illustration 112 also includes a first horizontal-line segment 118a and a second horizontal-line segment 118b (collectively referred to as "horizontal-line segments 118a, 118b"). The edges of the horizontal-line segments 118a, 118b are aligned with the horizontal reference lines within the pixel grid 110. The vertical-line segments 116a, 116b and the horizontal-line segments 118a, 118b (collectively referred to as "axial-line segments 116a-118b") likewise comprise shaded pixels. These shaded pixels together form each of the axial-line segments 116a-118b.

As suggested above, however, horizontal and vertical-line segments may respectively appear offset to (instead of aligned with) horizontal and vertical reference lines. Although FIG. 1A includes visible horizontal and vertical reference lines as part of the pixel grid 110, such reference lines may be invisible or, alternatively, may comprise horizontal or vertical borders of a canvas. As shown in FIG. 1A, for example, the vertical-line segments 116a, 116b and the horizontal-line segments 118a, 118b may respectively appear parallel to a vertical canvas border 124 and a horizontal canvas border 126 of the canvas 108. The vertical canvas border 124 and the horizontal canvas border 126 each provide part of the border for the canvas 108 within the graphical user interface 106.

In addition to the axial-line segments 116a-118b, the digital illustration 112 also comprises diagonal-line segments that form the corners of the digital illustration 112, such as a diagonal line segment 122. The diagonal line segment 122 comprises shaded pixels of varying shades that, when viewed together, appear diagonal to the horizontal and vertical reference lines of the pixel grid 110. Because the diagonal line segment 122 is diagonal to the horizontal and vertical reference lines, the diagonal line segment 122 is not an axial-line segment.

As further depicted in FIG. 1A, the digital illustration 112 appears blurry. It appears blurry in part because the axial-line segments 116a-118b are themselves blurry. FIG. 1A represents the blurriness of the axial-line segments 116a-118b with both (a) lighter shaded pixels throughout the body of the axial-line segments 116a-118b and (b) wider line segments. By contrast, after the digital illustration system sharpens the appearance of the axial-line segments 116a-118b, the axial-line segments 116a-118b comprise (a) darker shaded pixels and (b) narrower line segments as shown in FIG. 1B. While FIG. 1A and other figures within this disclosure represent blurriness with lighter shaded pixels and wider line segments—and represent sharpness with darker shaded pixels and narrower line segments—these depictions are merely representative of blurriness and sharpness. A skilled artisan understands that the appearance of blurriness and sharpness may be represented in other ways.

In addition to generating digital illustrations in various forms of sharpness, the digital illustration system also moves digital illustrations in response to commands from a user. As shown in FIG. 1A, for example, the digital illustration system provides a cursor 120 that a user may use to move the digital illustration 112. In some embodiments, the digital illustration system receives a command to move the digital illustration 112 when the user clicks, holds, and drags a mouse or performs some other user interaction that initiates a command to move. In alternative embodiments, the digital illustration system receives a command to move the digital illustration 112 when the user interacts with the digital illustration 112 through touch gestures (e.g., by a dragging touch gesture).

As indicated by FIG. 1A, the digital illustration system receives an indication of a click, hold, and drag as represented by the cursor 120 and a direction arrow 114. The direction arrow 114 indicates a direction specified by the command to move the digital illustration. While the direction arrow 114 depicts a particular direction, the digital illustration system may move (and sharpen) the digital illustration 112 in any direction and for any distance within the canvas 108.

Upon receiving the command to move the digital illustration, the digital illustration system determines whether translating the axial-line segments 116a-118b relative to the pixel grid 110 would sharpen the appearance of each of the axial-line segments 116a-118b. In particular, the digital illustration system determines whether translating the axial-line segments 116a-118b any fraction of a pixel would align the edges of the axial-line segments 116a-118b with the pixel grid 110 in a manner that would sharpen the axial-line segments 116a-118b. In making that determination, the digital illustration system separately determines that a vertical translation would sharpen the appearance of the vertical-line segments 116a, 116b and that a horizontal translation would sharpen the appearance of the horizontal-line segments 118a, 118b.

The digital illustration system affirmatively makes such a determination for the vertical-line segments 116a, 116b because both the first vertical-line segment 116a and the second vertical-line segment 116b have the same stroke setting and are misaligned by a same fraction of a pixel. Similarly, the digital illustration system affirmatively makes such a determination for the horizontal-line segments 118a, 118b because both the first horizontal-line segment 118a and the second horizontal-line segment 118b have the same stroke setting and are misaligned by a same fraction of a pixel.

Having determined that translation would sharpen the appearance of the axial-line segments 116a-118b, the digital illustration system generates a horizontal-translation vector that would translate the vertical-line segments 116a, 116b a particular fraction of a pixel in a horizontal direction. Similarly, the digital illustration system generates a vertical-translation vector that would translate the horizontal-line segments 118a, 118b a particular fraction of a pixel in a vertical direction. The horizontal and vertical-translation vectors would respectively sharpen the appearance of the vertical-line segments 116a, 116b and the horizontal-line segments 118a, 118b.

As used in this disclosure, the term "translation vector" refers to a vector with both a pixel length and a direction. Relatedly, the term "translation" refers to moving a digital illustration, line-segment, pixel, or other component of a digital illustration by a pixel distance, such as a certain fraction of a pixel in a given direction. For example, a translation vector may specify a vector for translating a pixel or an axial-line segment 0.25 pixels to the left or to the right. Within a pixel grid, the translation vector may specify translating a pixel or an axial-line segment 0.75 pixels horizontally in a positive or negative direction relative to a position of a digital illustration or pixel. In some embodiments, a translation vector may comprise a vertical or horizontal direction, such as a vertical translation vector that would translate a horizontal-line segment to the right 3.5 pixels. Alternatively, a translation vector may comprise both vertical and horizontal directions, such as a translation vector that would translate a vertical-line segment upwards 0.5 pixel and to the right 0.5 pixel.

As indicated by FIG. 1A, the digital illustration system generates translation vectors for the vertical-line segments 116a, 116b and the horizontal-line segments 118a, 118b. Specifically, the digital illustration system generates a horizontal-translation vector that translates each pixel within the vertical-line segments 116a, 116b a particular fraction of a pixel (e.g., 0.25 pixel, 0.33 pixel, 0.5 pixel) in a negative horizontal direction to align the edges of the vertical-line segments 116a, 116b with the pixel grid. Similarly, the digital illustration system generates a vertical-translation vector that translates each pixel within the horizontal-line segments 118a, 118b a particular fraction of a pixel (e.g., 0.25 pixel, 0.33 pixel, 0.5 pixel) in a positive vertical direction to align the edges of the horizontal-line segments 118a, 118b with the pixel grid.

After generating translation vectors, the digital illustration system detects a direction of the command to move. To detect that direction, the digital illustration system determines the difference between an original location where the user interacted with the digital illustration 112 (e.g., by mouse click or touch gesture) and a subsequent location where the user terminates the user interaction (e.g., by mouse release or termination of a touch gesture). The direction of a command to move may be measured by, for example, a positive or negative horizontal direction relative to the original location of a digital illustration and/or a positive or negative vertical direction relative to the original location of the digital illustration.

The direction arrow 114 in FIG. 1A indicates such a direction. As indicated by the direction arrow 114, the digital illustration system detects a negative horizontal direction relative to the original location of the digital illustration 112 and a positive vertical direction relative to the original location of the digital illustration 112. In additional or alternative embodiments, the digital illustration system may detect (and subsequently move) a digital illustration in a horizontal direction (without vertical movement) or a vertical direction (without horizontal movement).

If the digital illustration system detects a direction of the command to move the digital illustration that conforms to the direction of the translation vector, the digital illustration system adds the translation vector to the original position of the digital illustration 112. In FIGS. 1A and 1B, the digital illustration system determines that the horizontal direction of the horizontal-translation vector conforms to the horizontal direction of the command to move the digital illustration. Accordingly, the digital illustration system adds the horizontal-translation vector (for the vertical-line segments 116a, 116b) to the original position of the digital illustration 112. For example, the digital illustration system may add the horizontal-translation vector to the original coordinates of the vertical-line segments 116a, 116b within the pixel grid 110.

Conversely, if the digital illustration system detects a direction of the command to move the digital illustration that differs from the direction of the translation vector, the digital illustration system then inverts the direction of the translation vector and adds it to the original position of the digital illustration 112 to adjust for the differing direction. The digital illustration system can invert the direction of a translation vector by using the following function: $x=(-1)*\text{sign}(x)*(1-x)$. In this inversion function, x represents a horizontal-translation vector or a vertical-translation vector.

In FIGS. 1A and 1B, the digital illustration system determines that the vertical direction of the vertical-translation vector differs from the vertical direction of the command to move the digital illustration. Accordingly, the digital illustration system inverts a direction of the translation vector and adds the vertical-translation vector (for the horizontal-line segments 118a, 118b) to the original position of the digital illustration 112. For example, the digital illustration system may add the vertical-translation vector with the inverted direction to the original coordinates of the horizontal-line segments 118a, 118b within the pixel grid 110.

After adding translation vectors to the original position of a digital illustration, the digital illustration system translates the digital illustration an integer number of pixels based on a distance indicated by the command to move the digital illustration. By translating the digital illustration according to the translation vectors and the command to move the digital illustration, the digital illustration system moves a digital illustration to a position that sharpens the appearance of the axial-line segments 116a-118b as part of a one-step movement. The new position includes both the fraction of pixels translated per the translation vectors and an integer number of pixels translated in vertical and/or horizontal directions consistent with the command to move the digital illustration.

As shown in FIG. 1B, the digital illustration system moves the digital illustration 112 to a position within the canvas 108 that sharpens the appearance of the axial-line segments. In this new position, both the vertical-line segments 116a, 116b and the horizontal-line segments 118a, 118b appear crisper. FIG. 1B illustrates the crisper vertical-line segments 116a, 116b and the crisper horizontal-line segments 118a, 118b with darker shaded pixels and narrower line segments than those shown in FIG. 1A.

To move the digital illustration 112 to the position shown in FIG. 1B, the digital illustration system translates the pixels forming the vertical-line segments 116a, 116b by the horizontal-translation vector and the pixels forming the horizontal-line segments 118a, 118b by the vertical-translation vector. Alternatively, the digital illustration system translates the entire vertical-line segments 116a, 116b by the horizontal-translation vector and the entire horizontal-line segments 118a, 118b by the vertical-translation vector. In addition to translation by translation vector, the digital illustration system also translates the pixels forming the digital illustration 112 by an integer number of pixels in a positive vertical direction and a negative horizontal direction—relative to the original position of the digital illustration 112—consistent with the received command to move the digital illustration.

As shown in FIGS. 1A and 1B, the digital illustration system translates the overall digital illustration 112 according to the translation vectors before translating the overall digital illustration 112 an integer number of pixels. The digital illustration system performs these translations, however, in one seamless movement within the canvas 108. In some embodiments, however, the digital illustration system translates the overall digital illustration 112 an integer number of pixels before translating the overall digital illustration 112 according to the translation vectors.

Regardless of the translation order, the digital illustration system adjusts the integer number of pixels when translating the overall digital illustration 112 to account for the particular fraction of a pixel specified by the translation vectors. In other words, in some embodiments, the digital illustration system translates the digital illustration 112 an integer number of pixels that differs slightly from the integer number of pixels specified by the command to move. The digital illustration system, therefore, approximates the end position of the digital illustration 112 specified by the command to place the digital illustration 112 in a position that sharpens the appearance of the axial-line segments 116a-118b.

While, in FIGS. 1A and 1B, the digital illustration system translates and sharpens the appearance of the two vertical-line segments 116a, 116b and the two horizontal-line segments 118a, 118b, in some embodiments, the digital illustration system translates and sharpens any number of axial-line segments 116a-118b. For example, the digital illustration system may translate and sharpen the appearance of three horizontal-line segments and sixteen vertical-line segments while moving a complex digital illustration, such as a calendar icon or building illustration. As another example, the digital illustration system may translate and sharpen the appearance of hundreds of horizontal-line segments and hundreds of vertical-line segments while moving a multi-segmented digital illustration, such as a digital illustration of a wheat field or maze.

As suggested above, the digital illustration system optionally translates and sharpens the appearance of axial-line segments of different orientations. Because the digital illustration 112 shown in FIGS. 1A and 1B is rectangular, the vertical-line segments 116a, 116b and the horizontal-line segments 118a, 118b are parallel to each other and respectively share overlapping vertical and horizontal coordinates. In some embodiments, however, the digital illustration system likewise translates and sharpens multiple, parallel horizontal-line segments that do not share overlapping horizontal coordinates, such as a parallelogram with horizontal-line segments without overlapping horizontal x coordinates. Alternatively, in some embodiments, the digital illustration system translates and sharpens multiple, parallel vertical-line segments that do not share overlapping vertical coordinates, such as a parallelogram with vertical-line segments without overlapping vertical y coordinates. Moreover, in some embodiments, the digital illustration system translates and sharpens multiple collinear lines, such as horizontal-line segments in a digital illustration of a star.

Figure 2A:
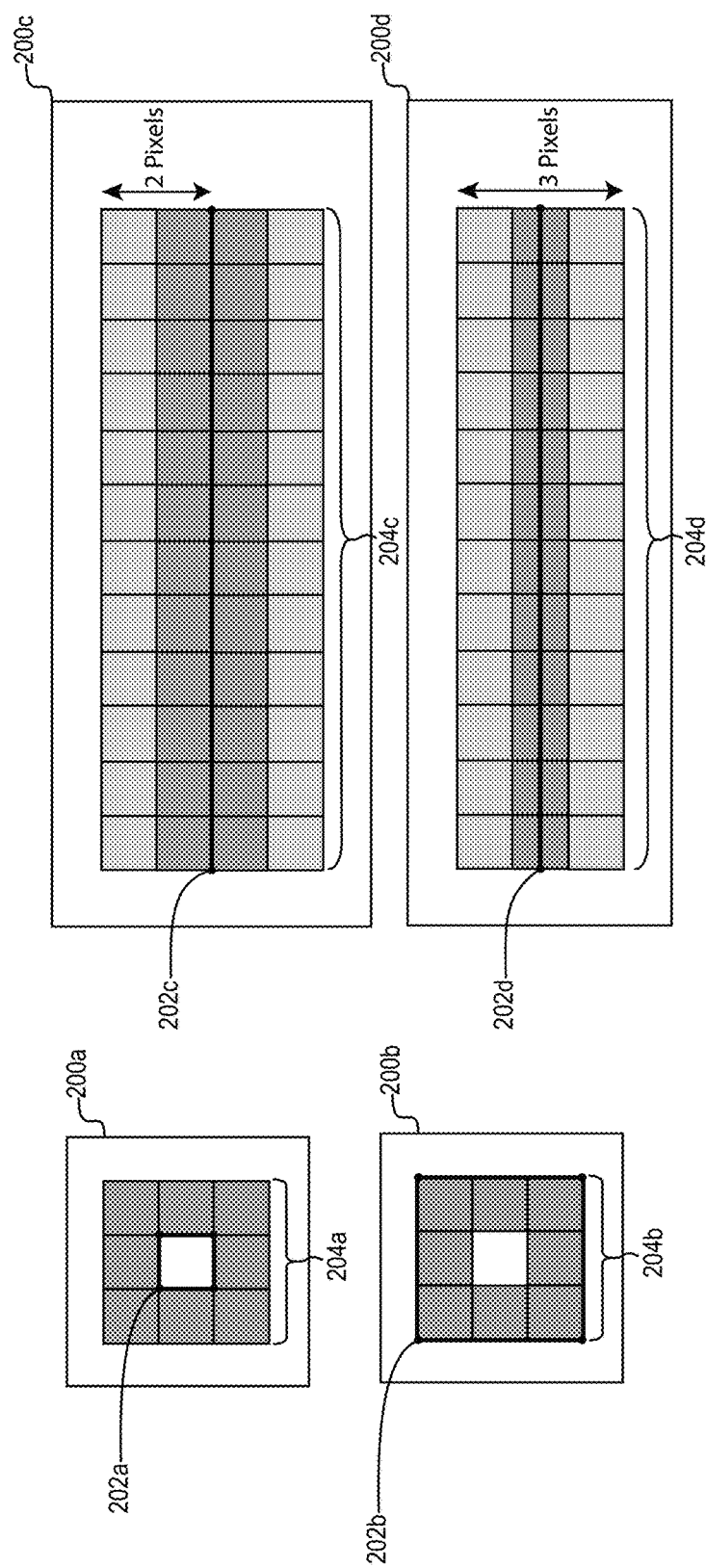
FIG. 2A illustrates stroke settings in accordance with one or more embodiments.
Figure 2B:
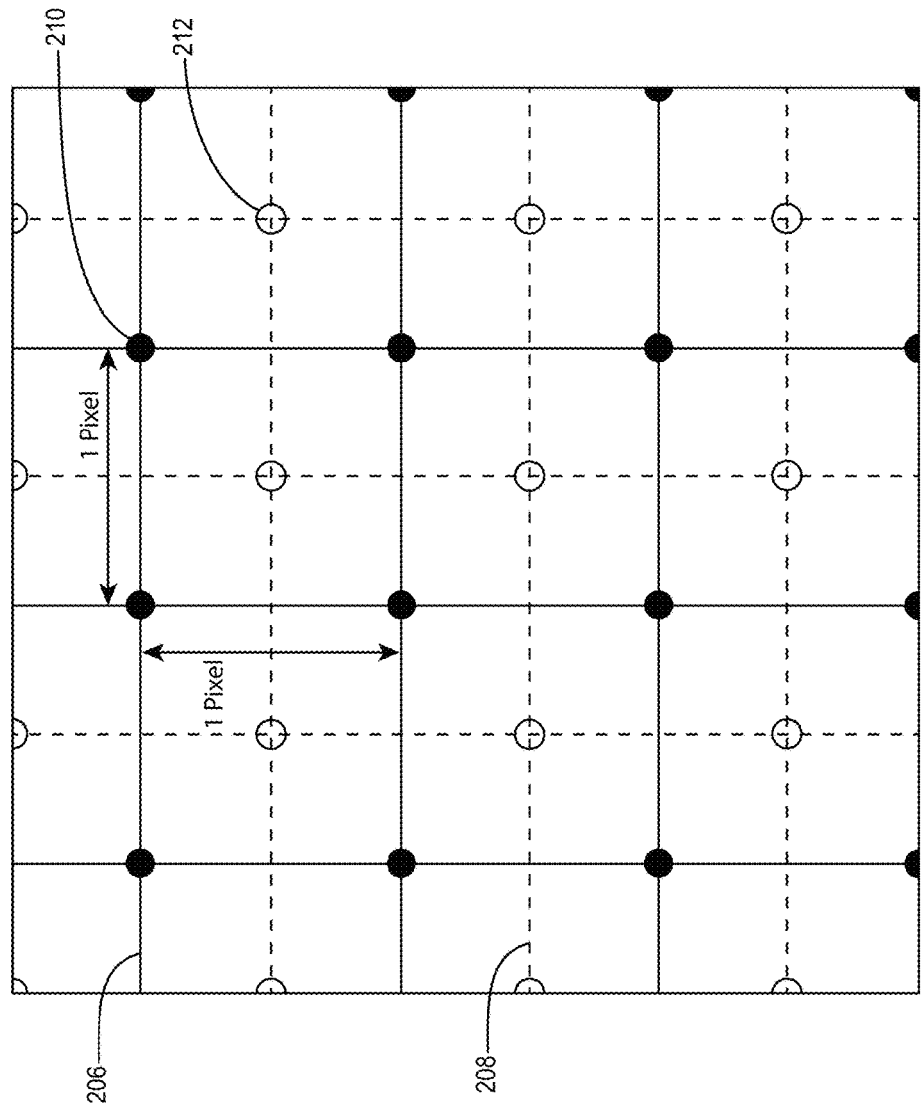
FIG. 2B illustrates a pixel grid and a sub-pixel grid in accordance with one or more embodiments.

Turning now to FIGS. 2A and 2B, these figures illustrate representations of stroke settings and pixel grids. The digital illustration system considers such stroke settings and pixel grids when determining whether translating axial-line segments relative to a pixel grid would sharpen the appearance of the axial-line segments. Whereas FIG. 2A illustrates stroke settings, FIG. 2B illustrates a pixel grid and a sub-pixel grid.

As indicated by FIG. 2A, when sharpening the appearance of a digital illustration, the digital illustration system identifies a stroke setting for the digital illustration or, alternatively, for individual axial-line segments. The digital illustration identifies stroke settings as an initial part of determining whether translating the axial-line segments would align each axial-line segment with a pixel grid or sub-pixel grid. FIG. 2A illustrates four different stroke settings: an outside-aligned-stroke setting 200a, an inside-aligned-stroke setting 200b, an evenly weighted-center-aligned-stroke setting 200c, and an oddly weighted-center-aligned-stroke setting 200d. The stroke settings 200a-200d shown in FIG. 2A are merely graphical representations of actual stroke settings found in metadata or computer-implemented instructions for rendering a digital illustration.

Each of the stroke settings 200a-200d specify how to align a line segment relative to an outline of the digital illustration. In particular, the outside-aligned-stroke setting 200a specifies that the digital illustration system align an axial-line segment 204a outside an outline 202a of a digital illustration. As shown, the axial-line segment 204a is part of a digital illustration shaped with a closed path, such as a rectangle or a square. The line segments of the digital illustration must be outside of the outline 202a, including the axial-line segment 204a, for the axial-line segment 204a to have a stroke setting of outside aligned. Conversely, the inside-aligned-stroke setting 200b specifies that the digital illustration system align an axial-line segment 204b inside an outline 202b of a digital illustration. As shown, the axial-line segment 204b is also part of a digital illustration shaped with a closed path, such as a rectangle or a square. The line segments of this digital illustration must be inside of the outline 202b, including the axial-line segment 204b, for the axial-line segment 204b to have a stroke setting of inside aligned.

By contrast, the evenly weighted-center-aligned-stroke setting 200c specifies that the digital illustration system center an axial-line segment 204c around an outline 202c of a digital illustration with an evenly weighted stroke. As shown in FIG. 2A, the axial-line segment 204c is evenly weighted because it comprises an even number of pixels. Similarly, the oddly weighted-center-aligned-stroke setting 200d specifies that the digital illustration system center an axial-line segment 204d around an outline 202d of a digital illustration with an oddly weighted stroke. The axial-line segment 204d is oddly weighted because it comprises an odd number of pixels.

These stroke settings 200a-200d represent individual stroke settings for axial-line segments or stroke settings for a larger portion of a digital illustration. While the stroke settings 200a-200d apply to the axial-line segments 204a-204d shown in FIG. 2A, similar stroke settings may apply to a full stroke comprising multiple line segments within a digital illustration. As shown in FIG. 1A, for example, an evenly weighted-center-aligned-stroke setting applies to a stroke of the digital illustration 112. In digital illustration 112, the stroke comprises the axial-line segments and the diagonal-line segments. In other words, the evenly weighted-center-aligned-stroke setting applies to the entire digital illustration 112. If the digital illustration 112 comprised multiple strokes, each stroke may correspond to different stroke settings.

As noted above, stroke settings inform the digital illustration system's sharpening process. Each of the stroke settings 200a-200d forms a basis for the digital illustration system to determine how to translate axial-line segments to sharpen the appearance of such line segments. Specifically, based on the stroke settings 200a-200d, the digital illustration system determines how to translate axial line segments by fractions of a pixel to align the edges of the axial-line segments flush with a pixel grid or a sub-pixel grid. This alignment of an axial-line segment's edges with a pixel grid or a sub-pixel grid makes for a crisper appearing axial-line segment.

FIG. 2B illustrates a pixel grid 206 and a sub-pixel grid 208. The pixel grid 206 includes solid vertical reference lines, solid horizontal reference lines, and solid intersection-point markers for the reference lines. A pixel-grid-intersection-point marker 210 represents one such pixel-grid-intersection-point marker. Each square within the pixel grid 206 represents a single pixel. Similarly, the sub-pixel grid 208 includes dotted vertical reference lines, dotted horizontal reference lines, and hollow intersection-point markers for the reference lines. The intersection-point markers of the sub-pixel grid 208 lie in the middle of each pixel of the pixel grid 206. A sub-pixel-grid-intersection-point marker 212 represents one such sub-pixel-grid-intersection-point marker.

As shown in FIG. 2B, the pixel-grid-intersection-point markers and the sub-pixel-grid-intersection-point markers represent actual intersection points. As shown within a canvas, intersection points are the point at which reference lines cross, such as the intersection points of the pixel grid 110 overlaid on the canvas 108 in FIG. 1A. FIG. 2B illustrates the pixel-grid-intersection-point markers and the sub-pixel-grid-intersection-point markers for ease of reference.

Both the pixel grid 206 and the sub-pixel grid 208 provide a reference for the digital illustration system's determination of how to translate axial-line segments to make them appear crisper. In making that determination, the digital illustration system follows the following stroke-setting reference rules. First, when collinear or parallel axial-line segments cannot be translated in a same direction by a same fraction of a pixel, the digital illustration system does not translate the collinear or parallel axial-line segments to sharpen their appearance.

Second, when the digital illustration system identifies an evenly weighted-center-aligned-stroke setting, an inside-aligned-stroke setting, or an outside-aligned-stroke setting for an axial-line segment that lacks another collinear or parallel axial-line segment (or for a digital illustration with such an axial-line segment), the digital illustration system determines that translating the axial-line segment a fraction of a pixel would align edges of the axial-line segment flush with the pixel grid. Similarly, when the digital illustration system identifies an evenly weighted-center-aligned-stroke setting, an inside-aligned-stroke setting, or an outside-aligned-stroke setting for collinear or parallel axial-line segments (or for a digital illustration with such axial-line segments), the digital illustration system determines that translating the collinear or parallel axial-line segments in a same direction a fraction of a pixel would align edges of the collinear or parallel axial-line segments flush with the pixel grid.

Third, when the digital illustration system identifies an oddly weighted-center-aligned-stroke setting for an axial-line segment that lacks another collinear or parallel axial-line segment (or for a digital illustration with such an axial line-segment), the digital illustration system determines that translating the axial-line segment a fraction of a pixel would align edges of the axial-line segment flush with a sub-pixel grid. Similarly, when the digital illustration system identifies an oddly weighted-center-aligned-stroke setting for collinear or parallel axial-line segments (or for a digital illustration with such axial-line segments), the digital illustration system determines that translating the collinear or parallel axial-line segments in a same direction a fraction of a pixel would align edges of the collinear or parallel axial-line segments flush with a sub-pixel grid.

In some embodiments, after determining that translating certain axial-line segments would sharpen their appearance, the digital illustration system generates translation vectors and moves the digital illustration. As described above, FIGS. 1A-1B provide some examples of that sharpening process. FIGS. 3A-3B and 4A-4B likewise provide additional examples of that sharpening process in a before-and-after comparison.

Figure 3A:
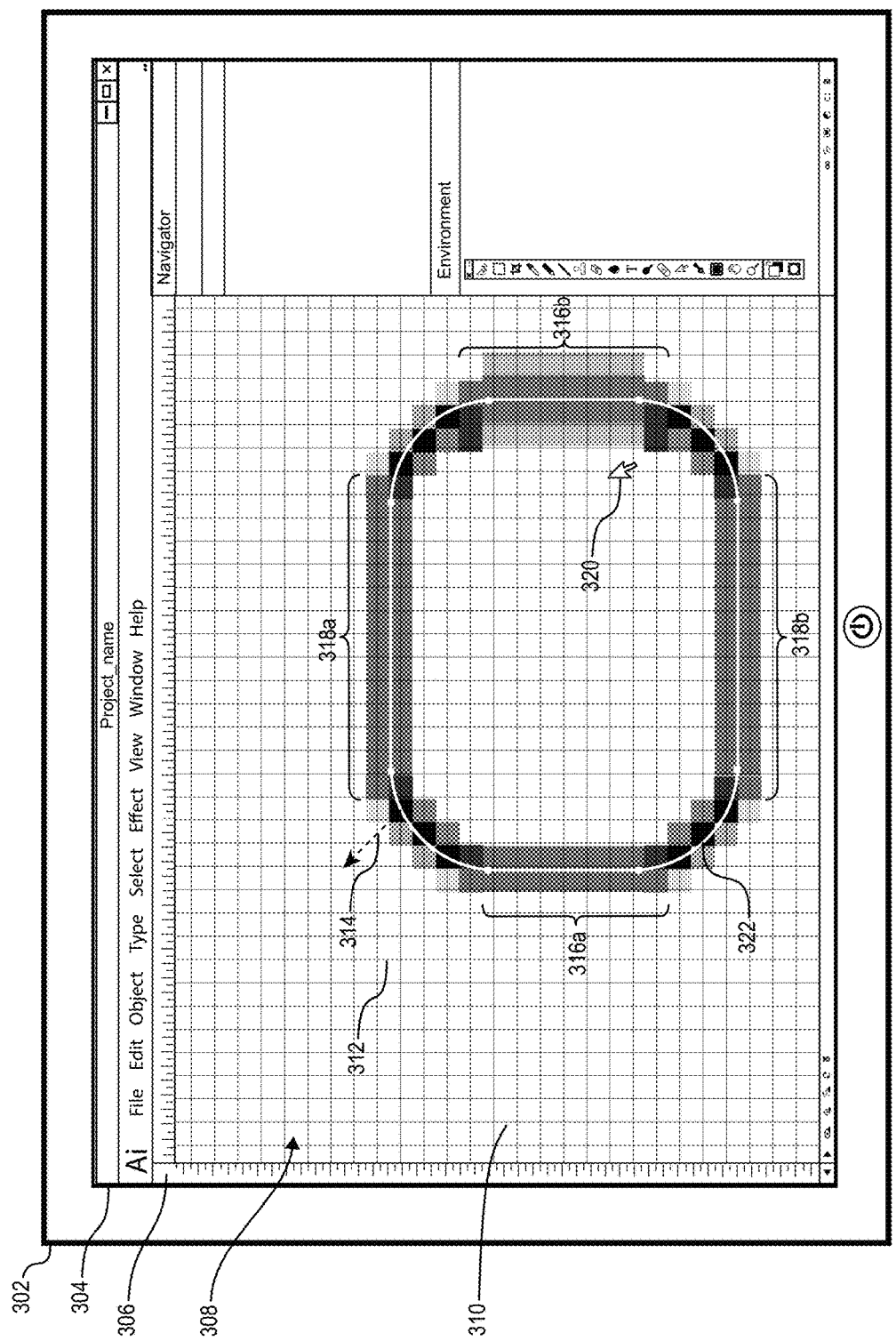
FIGS. 3A-3B illustrate views of a graphical user interface in which a digital illustration system sharpens an appearance of some axial-line segments of a digital illustration while moving the digital illustration in accordance with one or more embodiments.
Figure 3B:
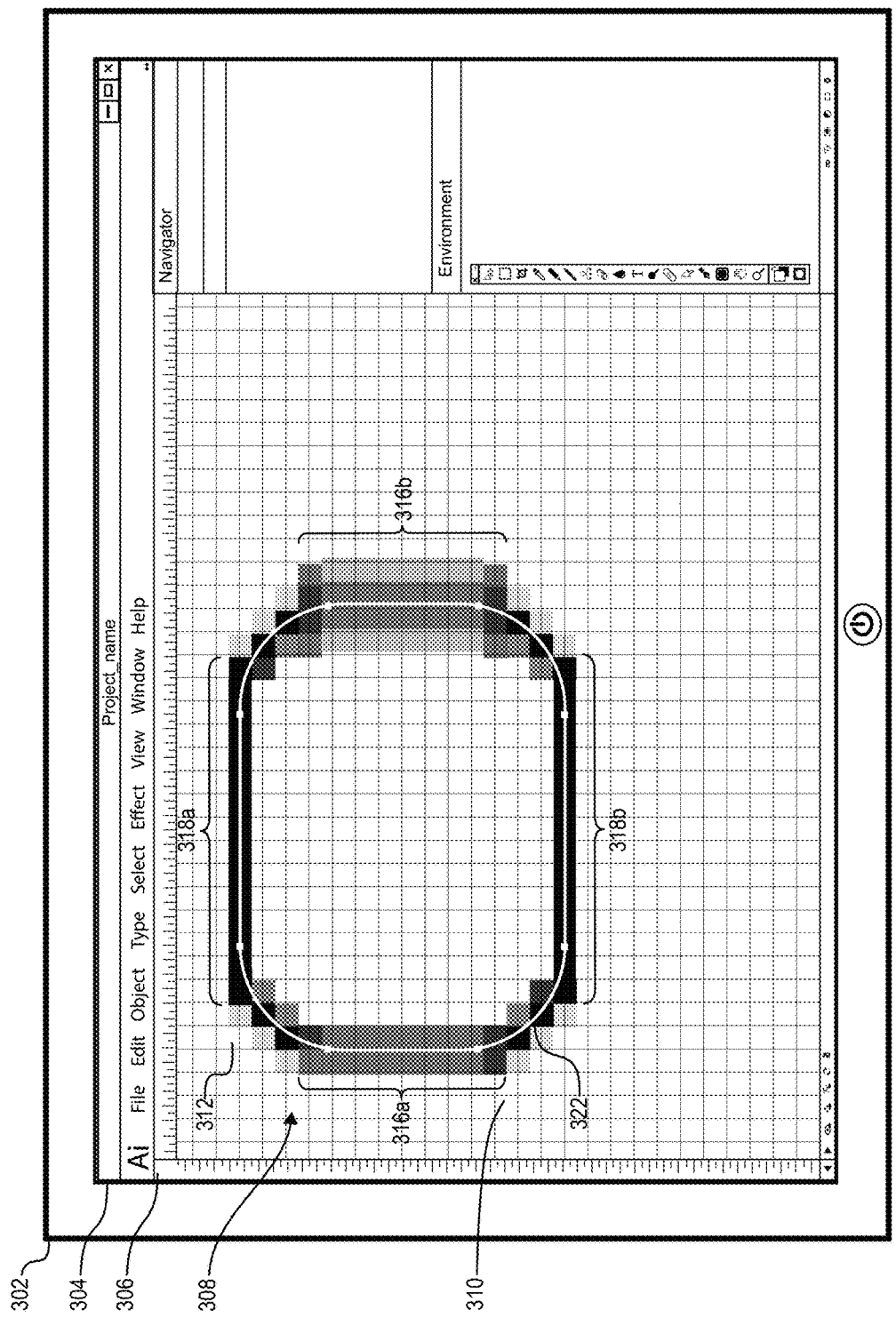

Specifically, FIGS. 3A-3B illustrate views of a graphical user interface in which the digital illustration system generates and sharpens an appearance of a digital illustration while moving the digital illustration. In contrast to the sharpening process shown in FIGS. 1A-1B, in FIGS. 3A-3B, the digital illustration system sharpens the appearance of only some of the axial-line segments of a digital illustration. As described below, the digital illustration system optionally sharpens the appearance of some, but not all, axial-line segments when it determines that translating some of the axial-line segments by a same fraction of a pixel would not sharpen the appearance of certain axial-line segments. As indicated by FIGS. 3A and 3B, the digital illustration system sharpens the appearance of some, but not all, axial-line segments of a digital illustration by not distorting the vector dimensions of the digital illustration and by ensuring that those axial-line segments that already appear sharp remain sharp in appearance after movement.

By way of background, in both FIGS. 3A and 3B, a client device 302 presents a digital illustration 312 within a graphical user interface 306 on a screen 304 of the client device 302. To create the graphical user interface 306, the digital illustration system causes the client device 302 to generate the digital illustration 312 within a canvas 308. The digital illustration system likewise causes the client device 302 to overlay a pixel grid 310 comprising horizontal and vertical reference lines on the canvas 308. One will appreciate that the pixel grid 110 is optional and shown for aid in describing embodiments of the disclosure.

As further shown in FIG. 3A, the digital illustration 312 includes a first vertical-line segment 316a and a second vertical-line segment 316b (collectively referred to as "vertical-line segments 316a, 316b"). The digital illustration 312 also includes a first horizontal-line segment 318a and a second horizontal-line segment 318b (collectively referred to as "horizontal-line segments 318a, 318b"). The vertical-line segments 316a, 316b and the horizontal-line segments 318a and 318b (collectively referred to as "axial-line segments 316a-318b") comprise shaded pixels. These shaded pixels together form each of the axial-line segments 316a-318b.

Similar to the digital illustration 112 from FIG. 1A, the digital illustration 312 shown in FIG. 3A appears blurry. FIG. 3A represents the blurriness of the axial-line segments 316a-318b with both lighter shaded pixels throughout the body of the axial-line segments 316a-318b and wider line segments. After the digital illustration system sharpens the appearance of the horizontal-line segments 318a, 318b in FIG. 3B, however, the horizontal-line segments 318a, 318b comprise darker shaded pixels and narrower line segments. By contrast, the vertical-line segments 316a, 316b remain blurry.

In the embodiment shown in FIGS. 3A and 3B, the digital illustration system does not sharpen the appearance of the vertical-line segments 316a, 316b while moving the digital illustration 312. The digital illustration system does not do so because the digital illustration system determines that all the vertical-line cannot be translated by the same fraction of a pixel to sharpen their appearance. In other words, the digital illustration system cannot translate each of the vertical-line segments 316a, 316b by the same fraction of a pixel to sharpen their appearance. As each of the vertical-line segments 316a, 316b are offset from the pixel grids by different amounts, the digital illustration system could only sharpen both vertical-line segments 316a, 316b by translating each of the vertical-line segments 316 by different fractions of a pixel. By contrast, the digital illustration system determines that the horizontal-line segments 318a, 318b can be translated by a same fraction of a pixel to sharpen their appearance.

When making those determinations, the digital illustration system initially identifies a stroke setting for the digital illustration 312 or, alternatively, for the individual axial-line segments 316a-318b. In FIG. 3A, the digital illustration system identifies an oddly weighted-center-aligned-stroke setting for each of the axial-line segments 316a-318b consistent with the disclosure above. As further shown in FIG. 3A, the outline 322 traces an internal frame of the digital illustration 312 as an indication of the stroke settings.

After identifying the stroke settings, the digital illustration system determines whether translating the vertical-line segments 316a, 316b by the same fraction of a pixel will align each vertical-line segment 316a, 316b with a sub-pixel grid (not shown). The digital illustration system also separately determines whether translating the horizontal-line segments 318a, 318b by the same fraction of a pixel would align each horizontal-line segment 318a, 318b with the sub-pixel grid (not shown). In FIG. 3A, the digital illustration system determines that a pixel distance between the first vertical-line segment 316a and a sub-pixel grid of the pixel grid 310, differs from a pixel distance between the second vertical-line segment 316b and the sub-pixel grid of the pixel grid 310. By contrast, the digital illustration system determines that the pixel distances are the same between the first horizontal-line segment 318a and the sub-pixel grid and the second horizontal-line segment 318b and the sub-pixel grid. In some embodiments, the digital illustration system optionally determines pixel distances between edges or centers of the axial-line segments 316a-318b and the pixel grid 310.

Having made translation determinations, the digital illustration system translates the horizontal-line segments 318a, 318b according to a vertical translation vector while moving the digital illustration 312. Specifically, the digital illustration system receives an indication of a click, hold, and drag (or other user interaction) from a user as represented by a cursor 320 and a direction arrow 314 within the graphical user interface 306. This user interaction triggers a command to move the digital illustration 312. Consistent with the disclosure above, the digital illustration system generates a vertical-translation vector for the horizontal-line segments 318a, 318b, detects a direction of a command to move, and adds an inverse of the vertical-translation vector to an original position of the digital illustration 312 to shift the digital illustration 312 such that the horizontal-line segments 318a, 318b align with the sub-pixel grid. The digital illustration system then moves the digital illustration 312 by an integer number of pixels from the shifted position to a new position shown in FIG. 3B based on the command to move the digital illustration 312.

As shown in FIG. 3B, the digital illustration system moves the digital illustration 312 to a position within the canvas 308 that sharpens the appearance of the horizontal-line segments 318a, 318b, but not the appearance of the vertical-line segments 316a, 316b. In this new position, the horizontal-line segments 318a, 318b appear crisper while the vertical-line segments 316a, 316b remain blurry.

Figure 4A:
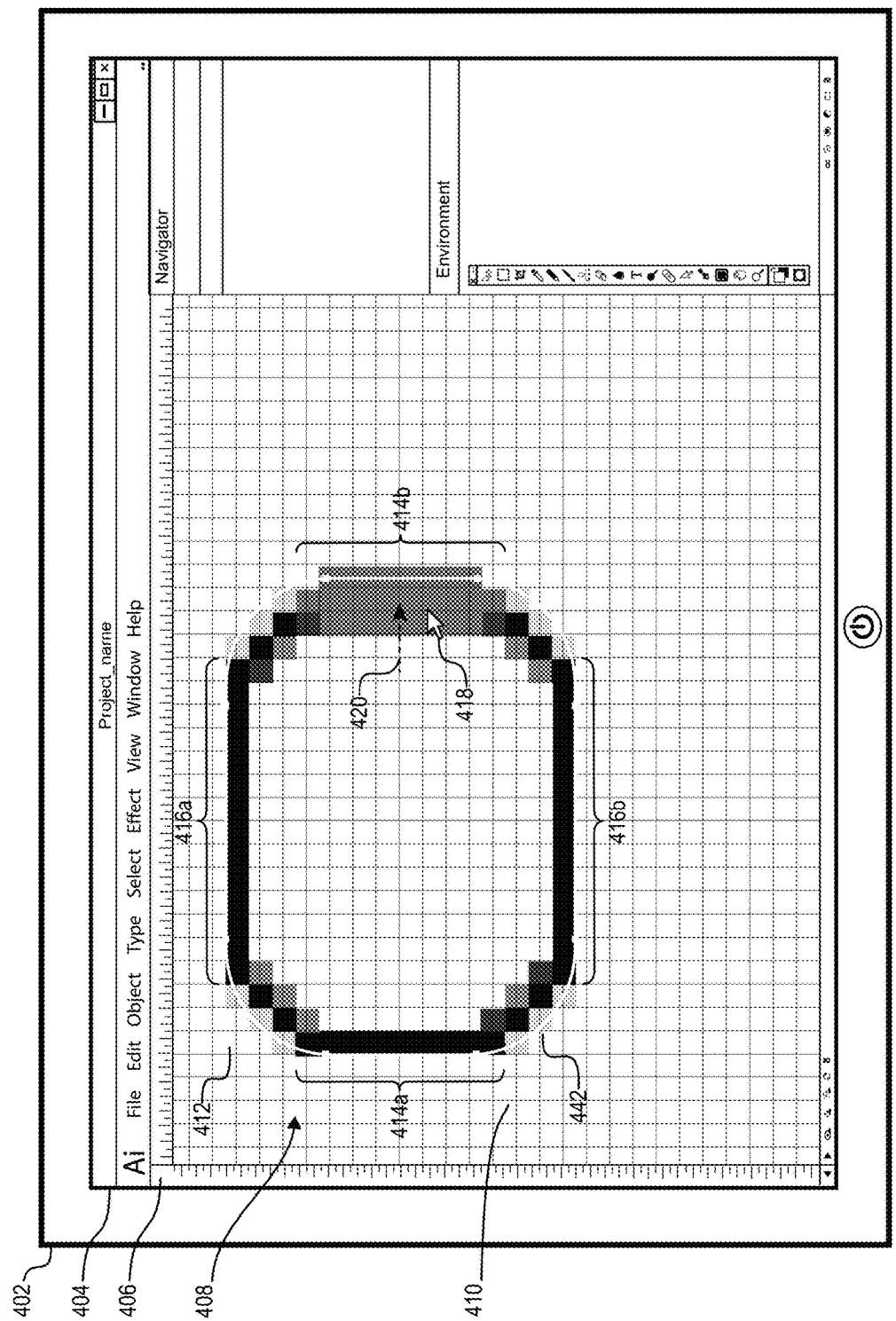
FIGS. 4A-4B illustrate views of a graphical user interface in which a digital illustration system sharpens an appearance of an axial-line segment of a digital illustration while moving the axial-line segment in accordance with one or more embodiments.
Figure 4B:
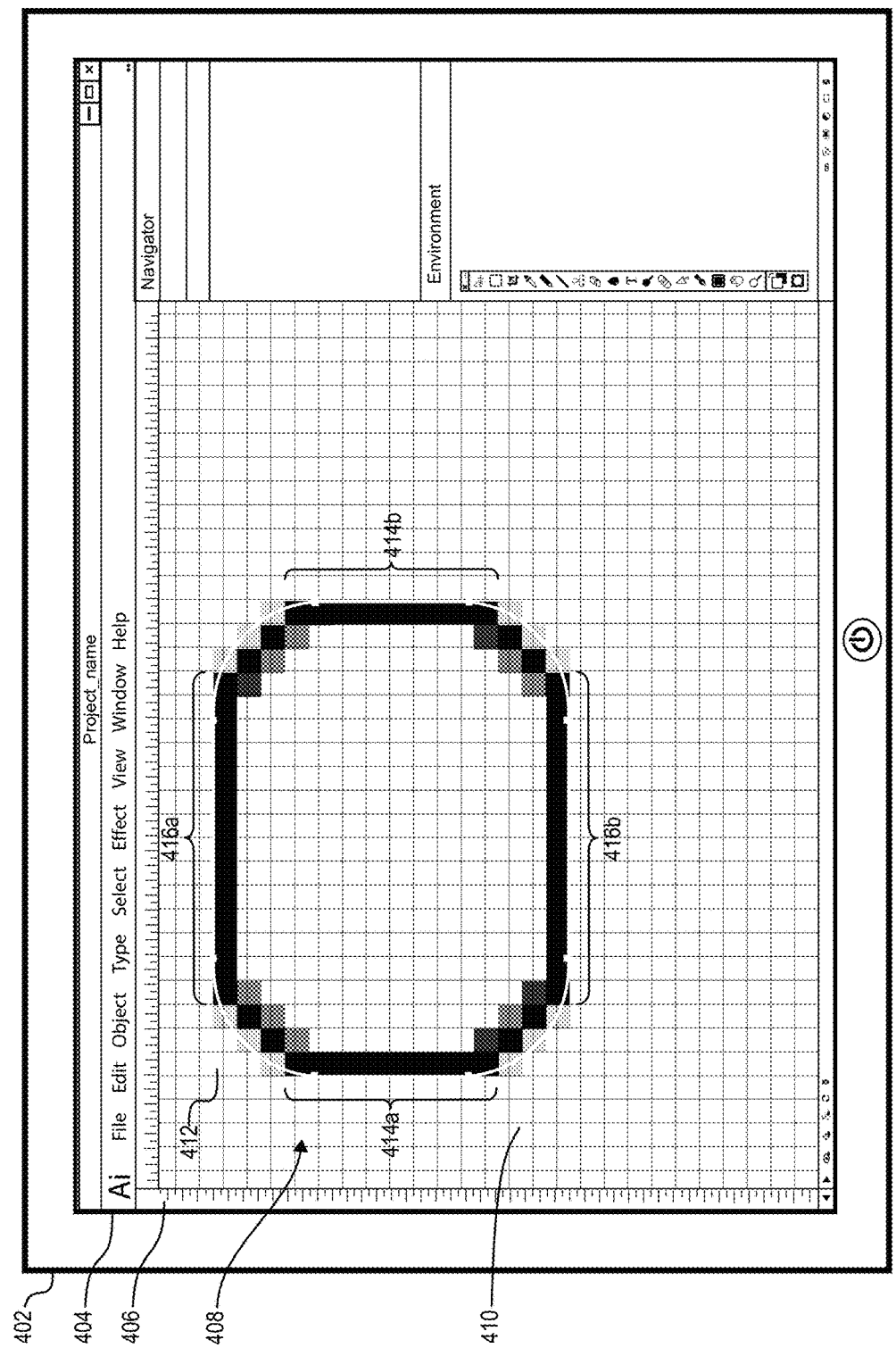

In addition to translating and sharpening the appearance of some (but not all) axial-line segments of a digital illustration, in some embodiments, the digital illustration system translates a single axial-line segment to sharpen its appearance. In such embodiments, the digital illustration sharpens the appearance of a single axial-line segment in response to a command to move specific to the single axial-line segment. FIGS. 4A and 4B provide a before-and-after comparison of a digital illustration in which the digital illustration system translates a single axial-line segment.

As shown in both FIGS. 4A and 4B, a client device 402 presents a digital illustration 412 within a graphical user interface 406 on a screen 404 of the client device 402. To create the graphical user interface 406, the digital illustration system causes the client device 402 to generate the digital illustration 412 within a canvas 408. The digital illustration system likewise causes the client device 402 to overlay a pixel grid 410 comprising horizontal and vertical reference lines on the canvas 408.

As further shown in FIG. 4A, the digital illustration 412 includes a first vertical-line segment 414a and a second vertical-line segment 414b (collectively referred to as "vertical-line segments 414a, 414b"). The digital illustration 412 also includes a first horizontal-line segment 416a and a second horizontal-line segment 416b (collectively referred to as "horizontal-line segments 416a, 416b"). The vertical-line segments 414a, 414b and the horizontal-line segments 416a, 416b (collectively referred to as "axial-line segments 414a-416b") comprise shaded pixels. These shaded pixels together form each of the axial-line segments 414a-416b. Unlike some of the embodiments described above, an outline 422 borders the outside edge of the axial-line segments 414a-416b. Accordingly, the outline 422 indicates an inside-aligned-stroke setting for the digital illustration 412.

In the embodiment shown in FIG. 4A, the digital illustration system receives an indication of a click, hold, and drag as represented by a cursor 418 and a direction arrow 420 within the graphical user interface 406. In contrast to some of the embodiments described above, however, this indication comprises a selection of the second vertical-line segment 414b. The selection represents a command to move the second vertical-line segment 414b. In some alternative embodiments, the digital illustration system may receive a command to move a single axial-line segment through an indication of some other suitable user interaction, such as a double-tap touch gesture of the single axial-line segment followed by a dragging motion.

After receiving the command to move the second vertical-line segment 414b, the digital illustration system determines whether translating the second vertical-line segment 414b relative to the pixel grid 410 would sharpen the appearance of the second vertical-line segment 414b. To make that determination, the digital illustration system identifies an inside-aligned-stroke setting for the second vertical-line segment 414b. Based on the inside-aligned-stroke setting, the digital illustration system determines that translating the second vertical-line segment 414b a fraction of a pixel would align the second vertical-line segment 414b flush with the pixel grid 410.

Upon determining that translation would sharpen the appearance of the second vertical-line segment 414b, the digital illustration system generates a horizontal-translation vector that would translate the second vertical-line segment 414b a particular fraction of a pixel in a horizontal direction. Specifically, the digital illustration generates a horizontal-translation vector that translates each pixel within the second vertical-line segment 414b in a negative horizontal direction to align the edges of the second vertical-line segment 414b with the pixel grid 410.

After generating the horizontal-translation vector, the digital illustration system detects a direction of the command and adds the horizontal-translation vector to an original position of the second vertical-line segment 414b. As shown in FIG. 4A, the digital illustration system detects that the direction of the command is in a negative horizontal direction and determines that the horizontal-translation vector and the direction of the command are the same. Accordingly, the digital illustration system adds the horizontal-translation vector to the original position of the second vertical-line segment 414b.

After adding the horizontal-translation vector, the digital illustration system continues to move the second vertical-line segment 414b based on the command. Specifically, the digital illustration system translates the second vertical-line segment 414b in a negative horizontal direction. Alternatively, in some embodiments, when adjusting a single axial-line segment, the digital illustration system translates the single axial-line segment by the translation vector without any additional movement.

As shown in FIG. 4B, the digital illustration system translates the second vertical-line segment 414b to a position that sharpens its appearance. FIG. 4B illustrates the crisper second vertical-line segment 414b with darker shaded pixels and a narrower line segment than that shown in FIG. 3A. The new position reflects the digital illustration system translating the second vertical-line segment 414b both the fraction of a pixel per the vertical-translation vector and the single pixel consistent with the command. Similar to some of the embodiments described above, the digital illustration system may adjust an integer number of pixels when translating the axial-line segment to account for the particular fraction of a pixel specified by the translation vector.

Figure 5:
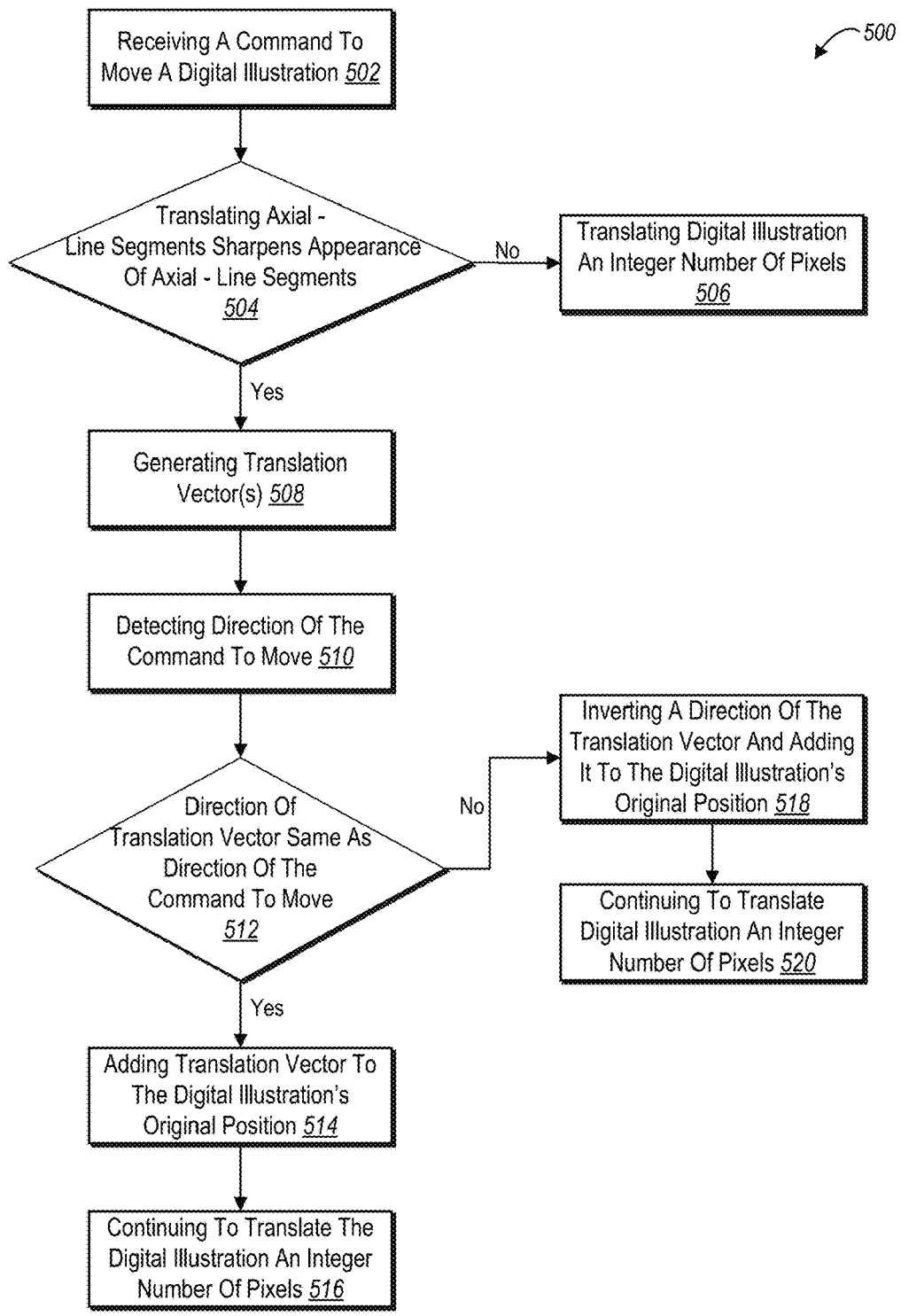
FIG. 5 illustrates a sequence-flow diagram of sharpening an appearance of a digital illustration in accordance with one or more embodiments.

Turning now to FIG. 5, this figure illustrates a sequence-flow diagram 500 of the digital illustration system sharpening an appearance of a digital illustration while moving the digital illustration in accordance with one or more embodiments. The sequence-flow diagram 500 includes a series of acts 502-520 that the digital illustration system performs to sharpen an appearance of a digital illustration. The acts 502-520 correspond to acts performed by certain embodiments of the digital illustration system described above.

As shown in FIG. 5, the digital illustration system performs the act 502 of receiving a command to move a digital illustration. When performing the act 502, in some embodiments, the digital illustration system receives a command to move the entire digital illustration. In alternative embodiments, the digital illustration system receives a command to move a single axial-line segment. As explained above, these commands may come from any suitable user interaction with a digital illustration, such as a mouse drag our touch gesture.

After receiving a command to move the digital illustration, the digital illustration system performs the act 504 of determining whether translating axial-line segments would sharpen the appearance of the axial-line segments. This disclosure describes the act 504 above with reference to FIGS. 2A and 2B. When performing the act 504, the digital illustration system identifies a stroke setting for a digital illustration system or, alternatively, individual axial-line segments. Stroke settings include inside aligned, outside aligned, evenly weighted center aligned, and oddly weighted center aligned.

Based on the stroke settings, the digital illustration system determines how to translate axial line segments by fractions of a pixel to align the edges of the axial-line segments flush with a pixel grid or a sub-pixel grid. When doing so, the digital illustration system follows the stroke-setting reference rules described above. That is, if collinear or parallel axial-line segments cannot be translated in a same direction by a same fraction of a pixel, the digital illustration system does not translate the collinear or parallel axial-line segments to sharpen their appearance.

If the digital illustration system identifies an evenly weighted-center-aligned-stroke setting, an inside-aligned-stroke setting, or an outside-aligned-stroke setting for an axial-line segment that lacks another collinear or parallel axial-line segment (or for a digital illustration with such an axial-line segment), the digital illustration system determines that translating the axial-line segment a fraction of a pixel would align edges of the axial-line segment flush with the pixel grid. Similarly, if the digital illustration system identifies an evenly weighted-center-aligned-stroke setting, an inside-aligned-stroke setting, or an outside-aligned-stroke setting for collinear or parallel axial-line segments (or for a digital illustration with such axial-line segments), the digital illustration system determines that translating the collinear or parallel axial-line segments in a same direction a fraction of a pixel would align edges of the collinear or parallel axial-line segments flush with the pixel grid.

Conversely, if the digital illustration system identifies an oddly weighted-center-aligned-stroke setting for an axial-line segment that lacks another collinear or parallel axial-line segment (or for a digital illustration with such an axial line-segment), the digital illustration system determines that translating the axial-line segment a fraction of a pixel would align edges of the axial-line segment flush with a sub-pixel grid. Similarly, if the digital illustration system identifies an oddly weighted-center-aligned-stroke setting for collinear or parallel axial-line segments (or for a digital illustration with such axial-line segments), the digital illustration system determines that translating the collinear or parallel axial-line segments in a same direction a fraction of a pixel would align edges of the collinear or parallel axial-line segments flush with a sub-pixel grid.

In certain embodiments, the digital illustration system determines that translating certain collinear or parallel axial-line segments by a same fraction of a pixel would not sharpen the appearance of certain axial-line segments. In such embodiments, the digital illustration system performs the act 506 of translating the digital illustration an integer number of pixels. In particular, the digital illustration system translates the digital illustration an integer number of pixels consistent with the command to move. But in such embodiments, the digital illustration system does not sharpen the appearance of a digital illustration's constituent axial-line segments.

As further shown in FIG. 5, when the digital illustration system determines that translating axial-line segments would sharpen the appearance of the axial-line segments, the digital illustration system performs the act 508 of generating translation vector(s). Consistent with the disclosure above, in some embodiments, the digital illustration system generates vertical-translation vectors for horizontal-line segments and horizontal-translation vectors for vertical-line segments. The translation vectors translate pixels within axial-line segments (or entire axial-line segments) a particular fraction of a pixel to align the edges of an axial-line segment with a pixel grid or sub-pixel grid. Moreover, when added to an original position of an axial-line segment, each translation vector aligns the axial-line segment flush with a pixel grid or sub-pixel grid.

After generating one or more translation vectors, the digital illustration system performs the act 510 of detecting a direction of the command to move. Consistent with the disclosure above, to detect such a direction, the digital illustration system determines the difference between an original location of a user interaction with a digital illustration (e.g., mouse click or touch gesture) and a subsequent location where the user terminates the user interaction (e.g., by mouse release or termination of a touch gesture). In some embodiments, the digital illustration system measures this difference in a positive or negative horizontal or vertical direction. Alternatively, the direction may comprise one or both of the horizontal or vertical directions.

Upon detecting the direction of the command, the digital illustration system performs the act 512 of determining whether the direction of the translation vector is the same as the direction of the command to move. In some embodiments, when performing the act 512, the digital illustration system compares a horizontal direction of a horizontal-translation vector with a horizontal direction of the command to move (e.g., a positive horizontal direction of a horizontal-translation vector to a negative horizontal direction of a command). Similarly, in some embodiments, the digital illustration system compares a vertical direction of a vertical-translation vector with a vertical direction of the command to move (e.g., a positive vertical direction of a vertical-translation vector to a negative vertical direction of a command). When a translation vector includes both horizontal and vertical directions, the digital illustration system compares both the horizontal and vertical directions of the translation vector to the horizontal and vertical directions of the command to move.

If the digital illustration system detects a direction of the command that conforms to the direction of the translation vector, the digital illustration system performs the act 514 of adding the translation vector to the digital illustration's original position. Consistent with the disclosure above, in some embodiments, the digital illustration system adds the translation vector to the original coordinates of an axial-line segment or the axial-line segment's individual pixels. By adding the translation vector to an axial-line segment's original coordinates, the digital illustration system identifies a particular fraction of a pixel that must be accounted for when later translating the digital illustration an integer number of pixels.

After adding the translation vector, the digital illustration system performs the act 516 of continuing to translate the digital illustration an integer number of pixels. The act 516 includes all the embodiments described above for translating a digital illustration an integer number of pixels. For example, in some embodiments, the digital illustration system translates each pixel, each component, or each line-segment of the digital illustration by an integer number of pixels consistent with the command to move. Alternatively, the digital illustration system translates a center or other point of the digital illustration and adjusts the position of the remaining pixels or other components of the digital illustration accordingly.

As noted above, in some embodiments of the act 516, the digital illustration system translates the digital illustration an integer number of pixels that differs slightly from the integer number of pixels specified by the command to move. In such embodiments, the digital illustration system approximates the end position of the digital illustration specified by the command to place the digital illustration in a position that sharpens the appearance of the axial-line segments and accounts for the translation vector(s).

In contrast to the acts 514 and 516, if the digital illustration system detects a direction of the command that differs from the direction of the translation vector, the digital illustration system performs the act 518 of inverting a direction of the translation vector and adding the translation vector to the digital illustration's original position. Consistent with the disclosure above, in some embodiments, the digital illustration system adds the translation vector with the inverted direction to the original coordinates of an axial-line segment or the axial-line segment's individual pixels.

After adding the translation vector, the digital illustration system performs the act 520 of continuing to translate the digital illustration an integer number of pixels. The act 520 corresponds to the act 516 above. Accordingly, the description and embodiments set forth above for the act 516 respectively apply to the act 520—except that the act 520 translates the digital illustration an integer number of pixels based both on the command and the translation vector(s).

Figure 6:
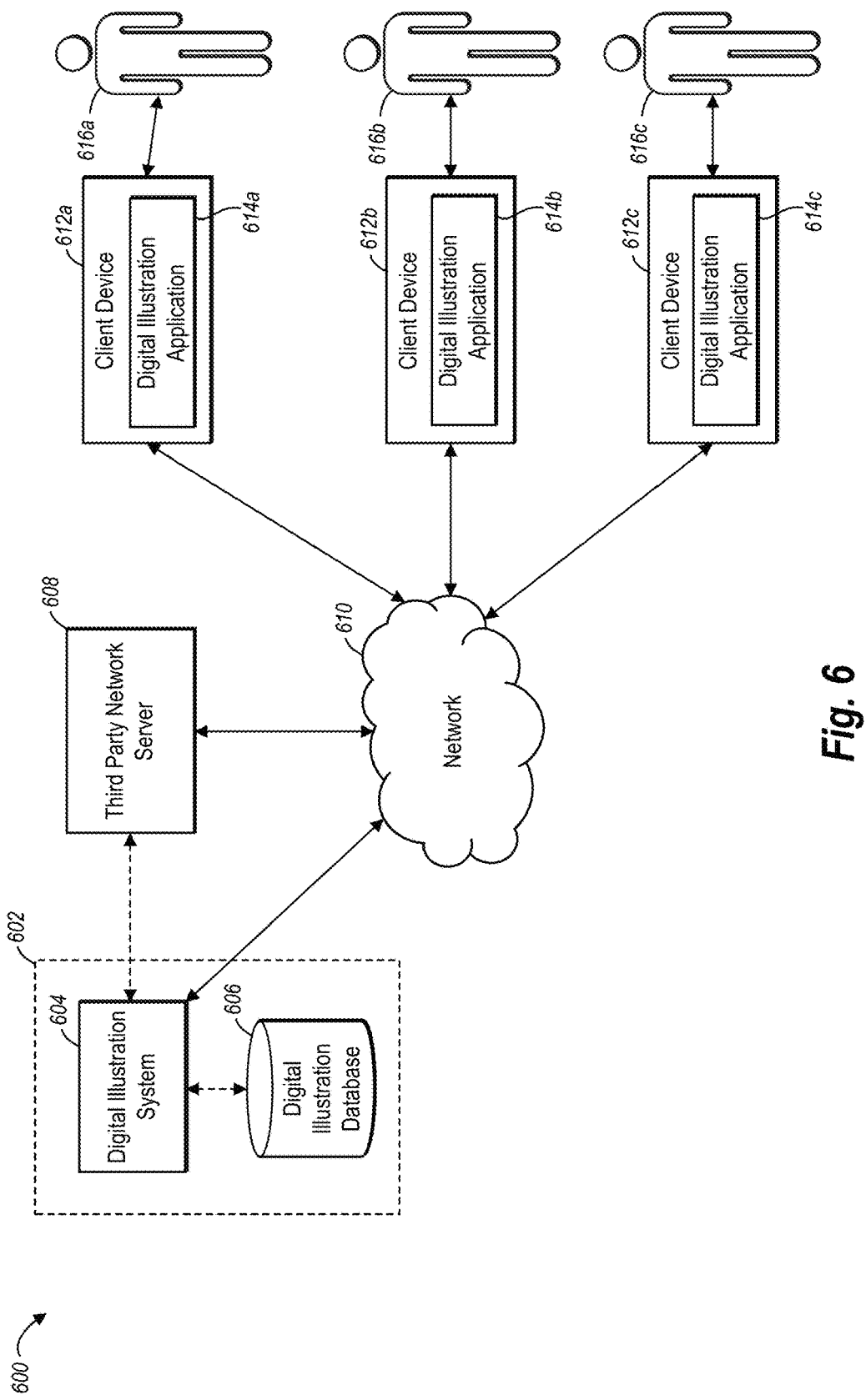
FIG. 6 illustrates a block diagram of an environment in which a digital illustration system can operate in accordance with one or more embodiments.
Figure 7:
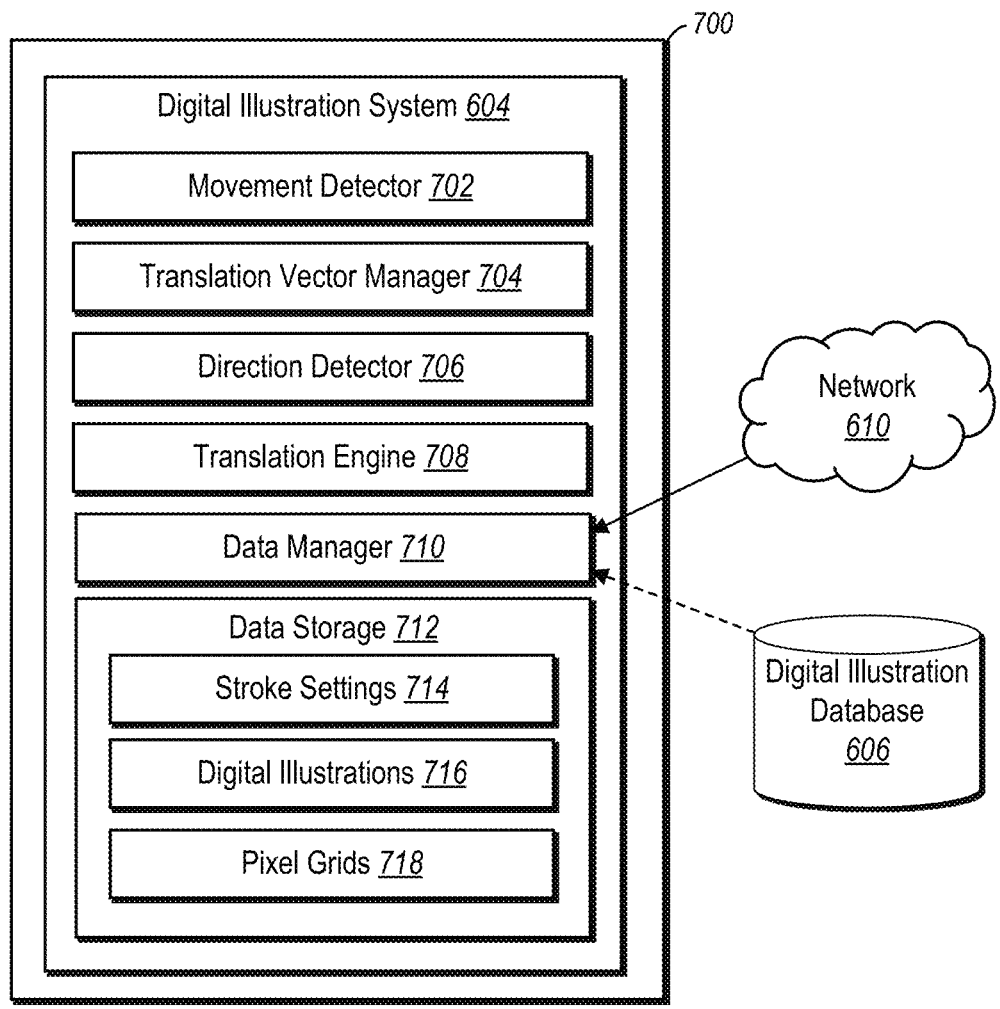
FIG. 7 illustrates a schematic diagram of the digital illustration system of FIG. 6 in accordance with one or more embodiments.

Turning now to FIGS. 6 and 7, these figures provide an overview of an environment in which a digital graphics system can operate and an example of an architecture for digital illustration system. FIG. 6 is a block diagram illustrating an environment 600 in which a digital graphics system 602 can operate in accordance with one or more embodiments. As illustrated in FIG. 6, the environment 600 includes the digital graphics system 602; third-party network server(s) 608, such as web server(s); client devices 612a, 612b, and 612c; users 616a, 616b, and 616c; and a network 610, such as the Internet.

As further illustrated in FIG. 6, the client devices 612a-612c communicate through the network 610 with the third-party network server(s) 608 and, in some embodiments, the digital illustration system 604. Although FIG. 6 illustrates an arrangement of the digital graphics system 602, the client devices 612a-612c, the users 616a-616c, the network 610, and the third-party network server(s) 608, various additional arrangements are possible. For example, the client devices 612a-612c may directly communicate with the third-party network server(s) 608 and thereby bypass the network 610.

As shown in FIG. 6, the users 616a-616c comprise users who access one or more digital illustrations or software applications provided (in whole or in part) by the digital illustration system 604 or the third-party network server(s) 608, including digital illustration applications 614a-614c. Additionally, the third-party network server(s) 608 provide data to the client devices 612a-612c that enable digital illustration applications 614a-614c to access, download, or upload digital illustrations. While FIG. 6 illustrates three users 616a-616c, in alternative embodiments, the environment 600 includes fewer or more than three users 616a-616c. For example, in other embodiments, the environment 600 includes hundreds, thousands, millions, or billions of users.

As also shown in FIG. 6, the digital graphics system 602 includes the digital illustration system 604 and a digital illustration database 606. The digital illustration system 604 accesses, manages, analyzes, and queries data corresponding to some or all the users 616a-616c, including digital illustrations associated with the users 616a-616c. For example, the digital illustration system 604 accesses and analyzes digital illustrations (corresponding to some or all the users 616a-616c) that are stored within the digital illustration database 606. Additionally, in some embodiments, the digital illustration system 604 accesses, manages, analyzes, and queries data corresponding to other users associated with the third-party network server(s) 608, such as digital illustrations of other users.

In one or more embodiments, the client devices 612a-612c transmit some or all the data (corresponding to some or all of the users 616a-616c) through the network 610 to the third-party network server(s) 608, such as when downloading digital illustrations or software applications or uploading digital illustrations. To generate the transmitted data or initiate communications, the users 616a-616c interact with the client devices 612a-612c, respectively. The client devices 612a-612c may include, but are not limited to, mobile devices (e.g., smartphones, tablets), laptops, desktops, or any other type of computing device, such as those described below in relation to FIG. 9. Similarly, the network 610 may comprise any of the networks described below in relation to FIG. 9.

In one or more embodiments, the digital illustration system 604 tracks various user data related to the communications between the client devices 612a-612c and the third-party network server(s) 608, including data associated with the digital illustration applications 614a-614c. For example, the digital illustration system 604 tracks user data that represents changes made to digital illustrations by any of the users 616a-616c and digital illustrations changed by the users 616a-616c. Alternatively, any one of the digital illustration applications 614a-614c tracks user data that represent the same actions performed by one of the associated users 616a-616c.

The digital illustration system 604 tracks user data in various ways. In one or more embodiments, the third-party network server(s) 608 tracks the user data and then reports the tracked user data to the digital illustration system 604. Alternatively, the digital graphics system 602 receives tracked user data directly from the client devices 612a-612c. In particular, the digital graphics system 602 may receive information through data stored on a client device (e.g., data associated with a digital illustration application, software application metadata, a browser cookie, cached memory), embedded computer code (e.g., tracking digital illustrations within and between canvases), a user profile, or engage in any other type of tracking technique. Accordingly, the digital illustration system 604 can receive tracked user data from the third-party network server(s) 608, the network 610, and/or the client devices 612a-612c.

As also illustrated in FIG. 6, the digital illustration system 604 is communicatively coupled to a digital illustration database 606. In one or more embodiments, the digital illustration system 604 accesses and queries data associated with one of the digital illustration applications 614a-614c from the digital illustration database 606 or sends data to the digital illustration database 606. As shown in FIG. 6, the digital illustration database 606 is separately maintained from the digital illustration system 604. Alternatively, in one or more embodiments, the digital illustration system 604 and the digital illustration database 606 comprise a single combined system, subsystem, or device.

Turning now to FIG. 7, this figure illustrates a schematic diagram of one embodiment of a computing device 700. In some embodiments, the computing device 700 is one or more servers that support the digital illustration system 604. In other embodiments, the computing device 700 is one of the client devices 612a-612c. As the computing device 700 suggests, in some embodiments, the client devices 612a-612c comprise the digital illustration system 604 or portions of the digital illustration system 604. In particular, in some instances, the client devices 612a-612c respectively use the digital illustration applications 614a-614c to perform the functions described above by the digital illustration system 604. In other words, in some embodiments, the client devices 612a-612c comprise a digital illustration system.

As shown, the computing device 700 includes the digital illustration system 604 and is communicatively coupled to both the network 610 and the digital illustration database 606. The digital illustration system 604 in turn includes, but is not limited to, a movement detector 702, a translation vector manager 704, a direction detector 706, a translation engine 708, a data manager 710, and a data storage 712. In some embodiments, the digital graphics system 602 includes or is coupled to the digital illustration database 606, as indicated by the dotted line in FIG. 7.

As shown in FIG. 7, the movement detector 702 detects a command to move a digital illustration. For example, in some embodiments, the movement detector 702 detects a command to move a single axial-line segment or an entire digital illustration. Consistent with the disclosure above, the movement detector 702 receives an indication of a user interaction (e.g., a mouse click or touch gesture) that triggers the translation engine 708 to move the digital illustration or a single axial-line segment within the digital illustration.

As also shown in FIG. 7, the translation vector manager 704 determines whether translating axial-line segments would sharpen their appearance and, if so, generates translation vectors. For example, the translation vector manager 704 initially identifies a stroke setting for a digital illustration system or, alternatively, for individual axial-line segments. Such stroke settings include inside-aligned, outside-aligned, evenly weighted-center-aligned, and oddly weighted-center-aligned-stroke settings. In some embodiments, the translation vector manager 704 determines that translating collinear or parallel axial-line segments in a same direction by a same fraction of a pixel would not sharpen their appearance. After identifying a stroke setting, the translation vector manager 704 follows the stroke-setting reference rules described above to determine whether translating axial-line segments would sharpen their appearance.

When the translation vector manager 704 determines that translating certain axial-line segments would sharpen their appearance, the translation vector manager 704 generates translation vectors. Consistent with the disclosure above, the translation vector manager 704 generates vertical-translation vectors for horizontal-line segments and horizontal-translation vectors for vertical-line segments. In some embodiments, however, the translation vector manager 704 generates translation vectors with both a horizontal and a vertical direction.

Additionally, and as shown in FIG. 7, the direction detector 706 detects a direction of a command to move and determines whether the direction of a translation vector is the same as the direction of the command to move. Consistent with the disclosure above, to detect such a direction, the direction detector 706 determines the difference between an original location of a user interaction with a digital illustration (e.g., mouse click or touch gesture) and a subsequent location where the user terminates the user interaction (e.g., by mouse release or termination of a touch gesture). In some embodiments, the direction detector 706 measures this difference in a positive or negative horizontal or vertical direction or, alternatively, in both horizontal and vertical directions. The direction detector 706 determines whether the direction of a translation vector differs or conforms to the direction of the command to move using the methods disclosed above.

As further shown in FIG. 7, the translation engine 708 adds generated translation vectors (or the translation vectors with inverted directions) to a digital illustration's original position. In some such embodiments, the translation engine 708 adds the translation vector (or the translation vector with an inverted direction) to the original coordinates of an axial-line segment or the axial-line segment's individual pixels. Before or after adding translation vector(s), the translation engine 708 translate a digital illustration an integer number of pixels. Consistent with the disclosure above, the translation engine 708 translates the digital illustration based on the translation vector(s) and the command to move. That translation involves the translation engine 708 accounting for both translation vector(s) and a command to move. When the translation vector manager 704 determines that translating certain axial-line segments would not sharpen their appearance, the translation engine 708 translates the digital illustration based on the command to move.

To facilitate managing data used by the digital illustration system 604, in some embodiments, the digital illustration system 604 also includes a data manager 710. As shown in FIG. 7, the data manager 710 receives, organizes, and/or stores user data from the network 610, the third-party network server(s) 608, and/or the client devices 612a-612c (e.g., the data manager 710 performs read/write functions in connection with a database). For example, in one or more embodiments, the data manager 710 accesses data related to digital illustration application usage provided or supported by the digital graphics system 602. As another example, when the digital illustration system 604 (or portions of the digital illustration system 604) reside within one of the client devices 612a-612c, the data manager 710 receives or accesses data from the third-party network server(s) 608, such as digital illustrations.

In some embodiments, the data manager 710 identifies information within the digital illustration database 606 or the data storage 712 based on a query. For example, in some embodiments, the data manager 710 receives a query from the translation vector manager 704 concerning the stroke settings of certain digital illustrations and/or the fraction of pixels that may separate an axial-line segment from a reference line within a pixel grid or sub-pixel grid. As another example, in some embodiments, the data manager 710 receives a query from the direction detector 706 concerning an original location of a user interaction with a digital illustration and a subsequent location where a user terminates the user interaction.

Similarly, in some embodiments, the digital illustration system 604 sends queries to the third-party network server(s) 608 to obtain information concerning digital illustrations. In some such embodiments, the data manager 710 receives a query to download a digital illustration from the third-party network server(s) 608.

As also shown in FIG. 7, the digital illustration system 604 includes the data storage 712. The data storage 712 optionally maintains stroke settings 714, digital illustrations 716, and pixel grids 718. In one or more embodiments, the stroke settings 714 comprise stroke settings for individual digital illustrations and/or individual axial-line segments. Moreover, in some embodiments, the digital illustrations 716 include the vector-based images or rasterized images of digital illustrations generated or modified by the digital illustration system 604. Additionally, in some embodiments, the data storage 712 maintains the pixel grids 718 that the digital illustration system 604 displays on a canvas, including sub-pixel grids.

Figure 8:
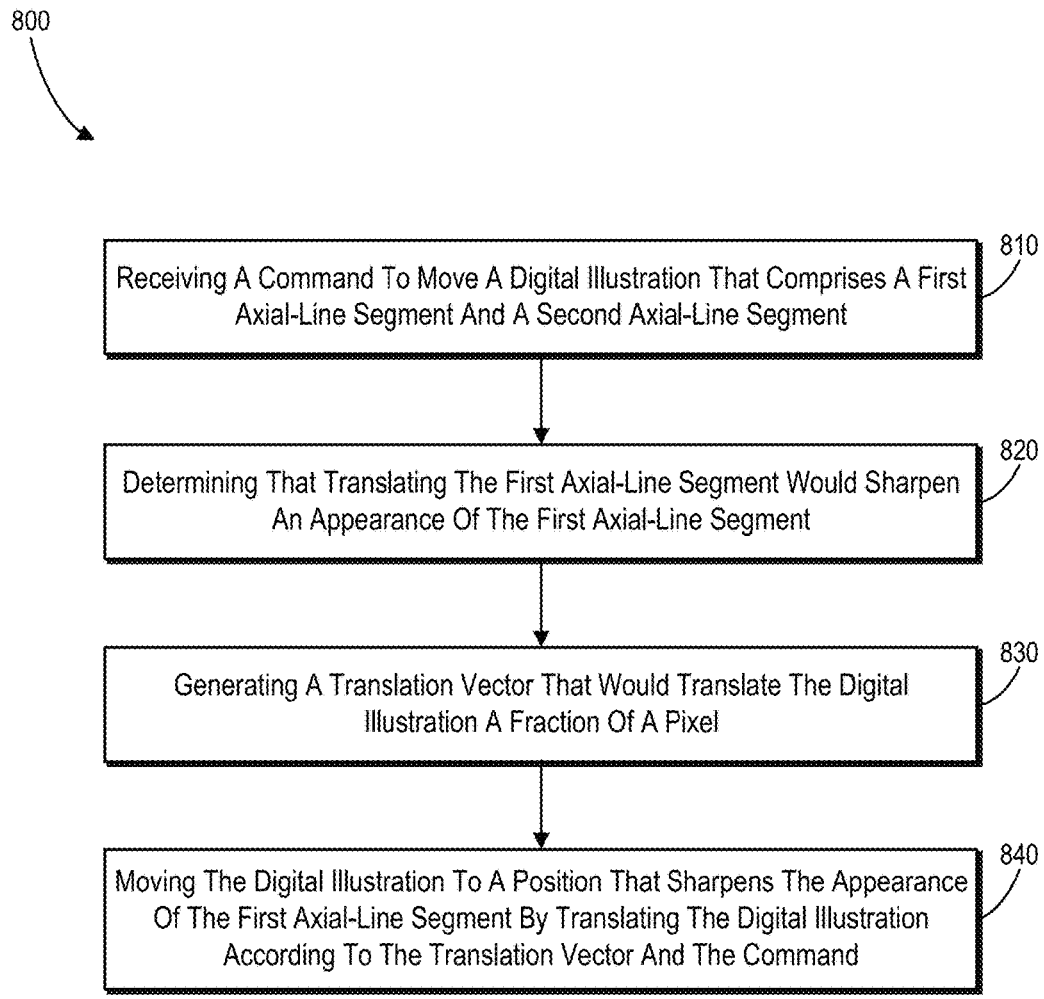
FIG. 8 illustrates a flowchart of a series of act in a method for sharpening blurry digital illustrations in accordance with one or more embodiments.

Turning now to FIG. 8, this figure illustrates a flowchart of series of acts in a method 800 of sharpening the appearance of blurry digital illustrations while moving the digital illustrations. As shown in FIG. 8, the method 800 includes an act 810 of receiving a command to move a digital illustration that comprises a first axial-line segment and a second axial-line segment. In particular, in some embodiments, the act 810 includes receiving a command to move a digital illustration, the digital illustration comprising a first axial-line segment and a second axial-line segment. Additionally, in some embodiments, receiving the command to move the digital illustration comprises receiving a command to cut the digital illustration from a first document and paste the digital illustration into a second document.

The digital illustration may take various forms. For example, in some embodiments, the digital illustration comprises a vector-based image. Moreover, in some embodiments, the first axial-line segment comprises a vertical-line segment and the second axial-line segment comprises a horizontal-line segment.

As also shown in FIG. 8, the method 800 includes an act 820 of determining that translating the first axial-line segment would sharpen an appearance of the first axial-line segment. In particular, in some embodiments, the act 820 includes determining that translating the first axial-line segment relative to a pixel grid would sharpen an appearance of the first axial-line segment.

For example, in some embodiments, the act 820 comprises identifying that a stroke setting for the axial-line segment specifies that the axial-line segment is center aligned with an evenly weighted stroke, inside aligned, or outside aligned; and determining that translating the axial-line segment a fraction of a pixel aligns edges of the axial-line segment with the pixel grid. Similarly, in some embodiments, the act 820 comprises identifying that a stroke setting for the axial-line segment specifies that the axial-line segment is center aligned with an oddly weighted stroke; and determining that translating the axial-line segment a fraction of a pixel aligns edges of the axial-line segment with a sub-pixel grid. Additionally, in some embodiments, the act 820 includes determining that translating both the first and second axial-line segments the fraction of a pixel in a same direction would sharpen the appearance of the first and second axial-line segments.

As further shown in FIG. 8, the method 800 includes an act 830 of generating a translation vector that would translate the digital illustration a fraction of a pixel. In particular, in some embodiments, the act 830 includes, in response to determining that translating the first axial-line segment relative to a pixel grid would sharpen the appearance of the first axial-line segment, generating a translation vector that would translate the digital illustration a fraction of a pixel to sharpen the appearance of the first axial-line segment.

As also shown in FIG. 8, the method 800 includes an act 840 of moving the digital illustration to a position that sharpens the appearance of the first axial-line segment by translating the digital illustration according to the translation vector and the command. For example, in some embodiments, moving the digital illustration comprises detecting a direction of the command to move the digital illustration; and adding the translation vector to an original position of the digital illustration. Relatedly, in some embodiments, adding the translation vector to the original position of the digital illustration comprises: determining that the direction of the command to move the digital illustration differs from a direction of the translation vector; inverting a direction of the translation vector; and adding the translation vector with the inverted direction to the original position of the digital illustration.

Moreover, in some embodiments, moving the digital illustration comprises: translating the first axial-line segment to align the edges of the first axial-line segment flush with the pixel grid according to the translation vector; and translating the digital illustration an integer number of pixels based on a distance indicated by the command. Relatedly, in some embodiments, moving the digital illustration comprises: translating the first axial-line segment to align the edges of the first axial-line segment flush with a sub-pixel grid according to the translation vector; and translating the digital illustration an integer number of pixels based on a distance indicated by the command.

Additionally, in some embodiments of the method 800, determining that translating the first axial-line segment relative to the pixel grid would sharpen the appearance of the first axial-line segment comprises determining that translating the first and second axial-line segments the fraction of a pixel relative to the pixel grid would sharpen the appearance of the first axial-line segment and an appearance of the second axial-line segment; generating the translation vector that would translate the digital illustration the fraction of a pixel to sharpen the appearance of the first axial-line segment comprises generating the translation vector that would translate the first and second axial-line segments the fraction of a pixel to sharpen the appearance of the first and second axial-line segments; and moving the digital illustration comprises moving the digital illustration to the position that sharpens the appearance of the first and second axial-line segments by translating the digital illustration according to the translation vector and the command.

Conversely, in some embodiments of the method 800, receiving the command to move the digital illustration comprises receiving a command to move the first axial-line segment; and moving the digital illustration comprises moving the first axial-line segment to the position that sharpens the appearance of the first axial-line segment by translating the first axial-line segment according to the translation vector and the command.

As noted above, in some embodiments, the digital illustration comprises a vector-based image. Relatedly, in some embodiments, the method 800 further comprises generating a rasterized image of the digital illustration in the position that sharpens the appearance of the first axial-line segment.

Additionally, in some embodiments of the method 800, the digital illustration comprises the first axial-line segment collinear or parallel to the second axial-line segment, a third axial-line segment collinear or parallel to a fourth axial-line segment, and the first and second axial-line segments are perpendicular to the third and fourth axial-line segments. In some such embodiments, the method 800 further comprises determining that translating the third and fourth axial-line segments by a same fraction of a pixel relative to the pixel grid would not sharpen appearances of the third and fourth axial-line segments.

In some such embodiments, determining that translating the first axial-line segment relative to the pixel grid would sharpen the appearance of the first axial-line segment comprises determining that translating the first and second axial-line segments by the fraction of a pixel relative to the pixel grid would sharpen appearances of the first and second axial-line segments; generating the translation vector that would translate the digital illustration the fraction of the pixel to sharpen the appearance of the first axial-line segment comprises, in response to determining that translating the first and second axial-line segments by the fraction of a pixel relative to the pixel grid would sharpen the appearances of the first and second axial-line segments, generating the translation vector that would translate the first and second axial-line segments the fraction of a pixel to sharpen the appearances of the first and second axial-line segments; moving the digital illustration comprises moving the digital illustration to the position that sharpens the appearances of the first and second axial-line segments by translating the digital illustration according to the translation vector and the command.

Moreover, in some embodiments, determining that translating the first axial-line segment relative to the pixel grid would sharpen the appearance of the first axial-line segment comprises: determining that translating the first and second axial-line segments by a first fraction of a pixel relative to the pixel grid would sharpen appearances of the first and second axial-line segments; determining that translating the third and fourth axial-line segments by a second fraction of a pixel relative to the pixel grid would sharpen appearances of the third and fourth axial-line segments; generating the translation vector that would translate the digital illustration the fraction of the pixel to sharpen the appearance of the first axial-line segment comprises, in response to determining that translating the first and second axial-line segments by the first fraction of a pixel and the third and fourth axial-line segments by the second fraction of a pixel would sharpen the appearances of the first, second, third, and fourth axial-line segments: generating a first translation vector that would translate the first and second axial-line segments the first fraction of a pixel to sharpen the appearances of the first and second axial-line segments; generating a second translation vector that would translate the third and fourth axial-line segments the second fraction of a pixel to sharpen the appearances of the third and fourth axial-line segments; moving the digital illustration comprises moving the digital illustration to the position that sharpens the appearances of the first, second, third, and fourth axial-line segments by translating the digital illustration according to the first and second translation vectors and the command.

In addition to the methods described above, in some embodiments, the method 800 includes a step for moving the digital illustration to a position that sharpens the appearance of the axial-line segment. For example, in some such embodiments, the method 800 includes, in response to receiving the command to move the digital illustration, a step for moving the digital illustration to a position that sharpens the appearance of the axial-line segment. Alternatively, in some embodiments, the method includes a step for moving the digital illustration to a position that sharpens the appearance of the first axial-line segment and the second axial-line segment.

The acts 508-520 of FIG. 5 represent acts that correspond to the step for moving the digital illustration to a position that sharpens the appearance of the axial-line segment or the step for moving the digital illustration to a position that sharpens the appearance of the first axial-line segment and the second axial-line segment. Accordingly, the description and embodiments set forth above for the acts 508-520 correspond to the step for moving the digital illustration to a position that sharpens the appearance of the axial-line segment and/or the step for moving the digital illustration to a position that sharpens the appearance of the first axial-line segment and the second axial-line segment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
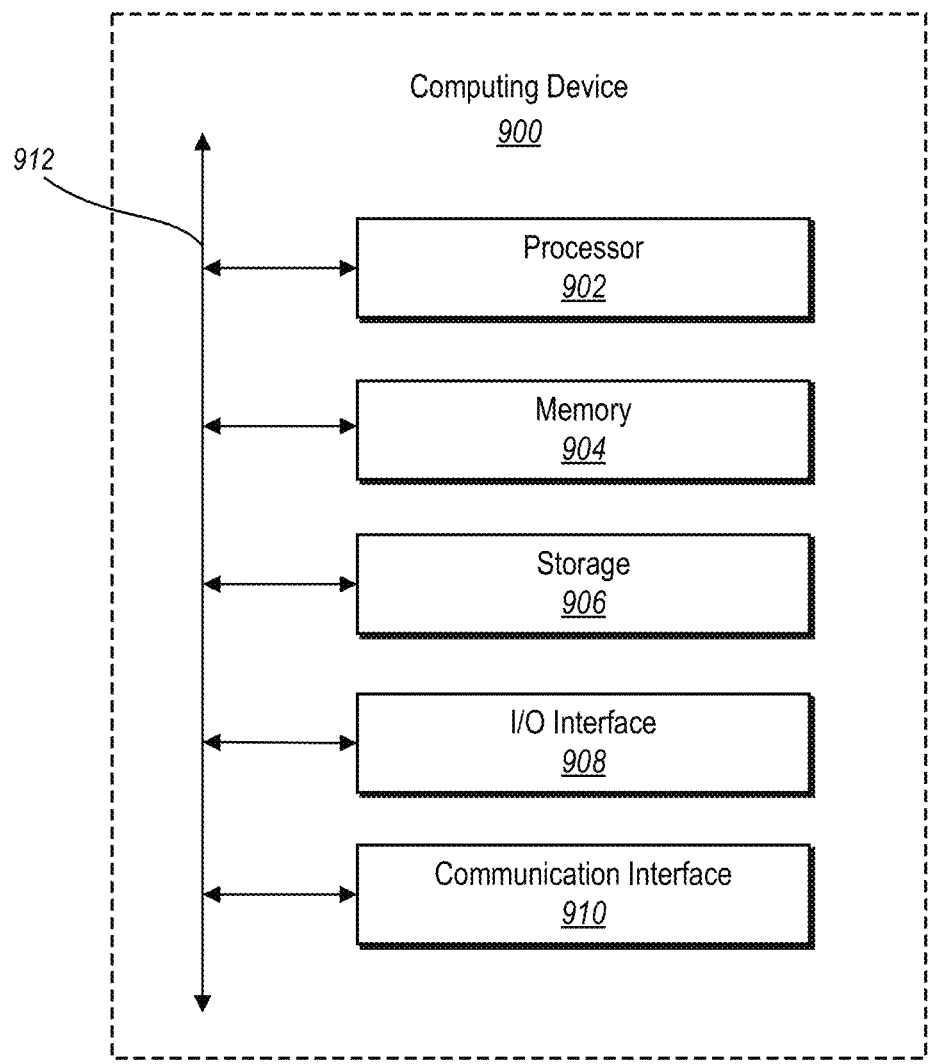
FIG. 9 illustrates a block diagram of an exemplary computing device for implementing one or more embodiments of the present disclosure.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wirebased network or a wireless NIC ("WNIC") or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for generating and modifying digital illustrations, a computer-implemented method of sharpening blurry digital illustrations without distorting corresponding digital-illustration shapes or dimensions comprising:
   receiving a command to move a digital illustration, the digital illustration comprising an axial-line segment;
   determining that the axial-line segment appears blurry before moving the digital illustration according to the command to move and that translating the axial-line segment relative to a pixel grid would sharpen an appearance of the axial-line segment; and
   in response to receiving the command to move the digital illustration and determining that the axial-line segment appears blurry before moving the digital illustration, performing a step for moving the digital illustration to a position that sharpens the appearance of the axial-line segment.

2. The method of claim 1, wherein the digital illustration comprises a vector-based image, the method further comprising generating a rasterized image of the digital illustration in the position that sharpens the appearance of the axial-line segment.

3. The method of claim 1, wherein determining that the axial-line segment appears blurry before moving the digital illustration according to the command to move and that translating the axial-line segment relative to the pixel grid would sharpen the appearance of the axial-line segment comprises:
   identifying that a stroke setting for the axial-line segment specifies that the axial-line segment is center aligned with an evenly weighted stroke, inside aligned, or outside aligned; and
   determining that translating the axial-line segment a fraction of a pixel aligns edges of the axial-line segment with the pixel grid.

4. The method of claim 1, wherein determining that the axial-line segment appears blurry before moving the digital illustration according to the command to move and that translating the axial-line segment relative to the pixel grid would sharpen the appearance of the axial-line segment comprises:
   identifying that a stroke setting for the axial-line segment specifies that the axial-line segment is center aligned with an oddly weighted stroke; and
   determining that translating the axial-line segment a fraction of a pixel aligns edges of the axial-line segment with a sub-pixel grid.

5. A non-transitory computer readable storage medium comprising instructions that, when executed by at least one processor, cause a computing device to:
   receive a command to move a digital illustration, the digital illustration comprising a first axial-line segment and a second axial-line segment;
   determine that the first axial-line segment appears blurry before moving the digital illustration according to the command and that translating the first axial-line segment relative to a pixel grid would sharpen an appearance of the first axial-line segment;
   in response to determining that translating the first axial-line segment relative to a pixel grid would sharpen the appearance of the first axial-line segment, generate a translation vector that would translate the digital illustration a fraction of a pixel to sharpen the appearance of the first axial-line segment; and
   in response to receiving the command to move the digital illustration and determining that the first axial-line segment appears blurry before moving the digital illustration, move the digital illustration to a position that sharpens the appearance of the first axial-line segment by translating the digital illustration according to the translation vector and the command.

6. The non-transitory computer readable storage medium of claim 5, wherein the first axial-line segment comprises a vertical-line segment and the second axial-line segment comprises a horizontal-line segment.

7. The non-transitory computer readable storage medium of claim 5, further comprising instructions that, when executed by the at least one processor, cause the computing device to:
   determine that the first axial-line segment appears blurry before moving the digital illustration according to the command and that translating the first axial-line segment relative to the pixel grid would sharpen the appearance of the first axial-line segment comprises by determining that translating the first axial-line segment a first fraction of a pixel in a first direction relative to the pixel grid and translating the second axial-line segment a second fraction of a pixel in a second direction relative to the pixel grid would sharpen the appearance of the first axial-line segment and an appearance of the second axial-line segment;

generate the translation vector that would translate the digital illustration to sharpen the appearance of the first axial-line segment by generating the translation vector that would translate the digital illustration the first and second fractions of a pixel to sharpen the appearance of the first and second axial-line segments; and move the digital illustration by moving the digital illustration to the position that sharpens the appearance of the first and second axial-line segments and by translating the digital illustration according to the translation vector and the command.

8. The non-transitory computer readable storage medium of claim 5, further comprising instructions that, when executed by the at least one processor, cause the computing device to move the digital illustration by:

detecting a direction of the command to move the digital illustration; and adding the translation vector to an original position of the digital illustration.

9. The non-transitory computer readable storage medium of claim 8, further comprising instructions that, when executed by the at least one processor, cause the computing device to add the translation vector to the original position of the digital illustration by:

determining that the direction of the command to move the digital illustration differs from a direction of the translation vector;

inverting a direction of the translation vector; and adding the translation vector with the inverted direction to the original position of the digital illustration.

10. The non-transitory computer readable storage medium of claim 5, further comprising instructions that, when executed by the at least one processor, cause the computing device to:

receive the command to move the digital illustration by receiving a command to move the first axial-line segment; and move the digital illustration by moving the first axial-line segment to the position that sharpens the appearance of the first axial-line segment and by translating the first axial-line segment according to the translation vector and the command.

11. The non-transitory computer readable storage medium of claim 5, further comprising instructions that, when executed by the at least one processor, cause the computing device to move the digital illustration by:

translating the first axial-line segment to align edges of the first axial-line segment flush with the pixel grid according to the translation vector; and translating the digital illustration an integer number of pixels based on a distance indicated by the command.

12. The non-transitory computer readable storage medium of claim 5, further comprising instructions that, when executed by the at least one processor, cause the computing device to move the digital illustration by:

translating the first axial-line segment to align edges of the first axial-line segment flush with a sub-pixel grid according to the translation vector; and translating the digital illustration an integer number of pixels based on a distance indicated by the command.

13. The non-transitory computer readable storage medium of claim 5, wherein the digital illustration comprises the first axial-line segment collinear or parallel to the second axial-line segment, a third axial-line segment collinear or parallel to a fourth axial-line segment, and the first and second axial-line segments are perpendicular to the third and fourth axial-line segments.

14. The non-transitory computer readable storage medium of claim 13, further comprising instructions that, when executed by the at least one processor, cause the computing device to determine that translating the third and fourth axial-line segments by a same fraction of a pixel relative to the pixel grid would not sharpen appearances of the third and fourth axial-line segments.

15. The non-transitory computer readable storage medium of claim 14, further comprising instructions that, when executed by the at least one processor, cause the computing device to:

determine that the first axial-line segment appears blurry before moving the digital illustration according to the command and that translating the first axial-line segment relative to the pixel grid would sharpen the appearance of the first axial-line segment by determining that translating the first and second axial-line segments by the fraction of a pixel relative to the pixel grid would sharpen appearances of the first and second axial-line segments;

generate the translation vector that would translate the digital illustration the fraction of the pixel to sharpen the appearance of the first axial-line segment by, in response to determining that translating the first and second axial-line segments by the fraction of a pixel relative to the pixel grid would sharpen the appearances of the first and second axial-line segments, generating the translation vector that would translate the digital illustration the fraction of a pixel to sharpen the appearances of the first and second axial-line segments; and move the digital illustration by moving the digital illustration to the position that sharpens the appearances of the first and second axial-line segments and by translating the digital illustration according to the translation vector and the command.

16. The non-transitory computer readable storage medium of claim 13, further comprising instructions that, when executed by the at least one processor, cause the computing device to:

determine that the first axial-line segment appears blurry before moving the digital illustration according to the command and that translating the first axial-line segment relative to the pixel grid would sharpen the appearance of the first axial-line segment by:

determining that the first and second axial-line segments appear blurry before moving the digital illustration according to the command and that translating the first and second axial-line segments by a first fraction of a pixel relative to the pixel grid would sharpen appearances of the first and second axial-line segments; and determining that the third and fourth axial-line segments appear blurry before moving the digital illustration according to the command and that translating the third and fourth axial-line segments by a second fraction of a pixel relative to the pixel grid would sharpen appearances of the third and fourth axial-line segments;

generate the translation vector that would translate the digital illustration the fraction of the pixel to sharpen the appearance of the first axial-line segment by, in response to determining that translating the first and second axial-line segments by the first fraction of a pixel and the third and fourth axial-line segments by the second fraction of a pixel would sharpen the appearances of the first, second, third, and fourth axial-line segments:

generating a first translation vector that would translate the digital illustration the first fraction of a pixel to sharpen the appearances of the first and second axial-line segments;

generating a second translation vector that would translate the digital illustration the second fraction of a pixel to sharpen the appearances of the third and fourth axial-line segments; and moving the digital illustration comprises moving the digital illustration to the position that sharpens the appearances of the first, second, third, and fourth axial-line segments by translating the digital illustration according to the first and second translation vectors and the command.

17. A system for sharpening blurry digital illustrations without distorting corresponding digital-illustration shapes or dimensions comprising:

a memory comprising a digital illustration, the digital illustration comprising a first axial-line segment and a second axial-line segment;

a computing device comprising instructions thereon that, when executed by at least one processor, cause the system to:

receive a command to move the digital illustration;

determine that the first and second axial-line segments appear blurry before moving the digital illustration according to the command;

determine that translating the first and second axial-line segments relative to a pixel grid would sharpen an appearance of the first and second axial-line segments;

in response to determining that translating the first and second axial-line segments relative to a pixel grid would sharpen the appearance of the first and second axial-line segments, generate a translation vector that would translate the first and second axial-line segments a fraction of a pixel to sharpen the appearance of the first and second axial-line segments; and in response to receiving the command to move the digital illustration and determining that the first and second axial-line segments appear blurry before moving the digital illustration, move the digital illustration to a position that sharpens the appearance of the first and second axial-line segments by translating the first and second axial-line segments the fraction of a pixel according to the translation vector and translating the digital illustration an integer number of pixels according to a distance indicated by the command.

18. The system of claim 17, further comprising instructions that, when executed by the at least one processor, cause the system to move the digital illustration further by:

detecting a direction of the command to move the digital illustration;

determining that the direction of the command to move the digital illustration conforms to a direction of the translation vector; and adding the translation vector to an original position of the digital illustration.

19. The system of claim 17, further comprising instructions that, when executed by the at least one processor, cause the system to determine that translating the first and second axial-line segments relative to the pixel grid would sharpen the appearance of the first and second axial-line segments by determining that translating both the first and second axial-line segments the fraction of a pixel in a same direction would sharpen the appearance of the first and second axial-line segments.

20. The system of claim 17, further comprising instructions that, when executed by the at least one processor, cause the system to receive the command to move the digital illustration by receiving a command to cut the digital illustration from a first document and paste the digital illustration into a second document.

* * * * *